United States Patent
Lavoie et al.

(10) Patent No.: US 10,277,835 B2
(45) Date of Patent: Apr. 30, 2019

(54) CASCADED STANDARDIZED HOT-PLUGGABLE TRANSCEIVING UNITS PROVIDING SCALING AND POSITIONING FUNCTIONALITIES

(71) Applicant: EMBRIONIX DESIGN INC, Laval (CA)

(72) Inventors: Renaud Lavoie, Laval (CA); Louis Caron, Mascouche (CA); Joel Martel, Longueuil (CA); Daniel Tremblay, Boisbriand (CA)

(73) Assignee: EMBRIONIX DESIGN INC., Laval (CA)

( * ) Notice: Subject to any disclaimer, the term of this patent is extended or adjusted under 35 U.S.C. 154(b) by 0 days.

(21) Appl. No.: 15/832,907

(22) Filed: Dec. 6, 2017

(65) Prior Publication Data

US 2019/0082121 A1   Mar. 14, 2019

Related U.S. Application Data

(60) Provisional application No. 62/556,531, filed on Sep. 11, 2017.

(51) Int. Cl.
| | |
|---|---|
| *H04N 5/64* | (2006.01) |
| *H04N 7/01* | (2006.01) |
| *H04N 5/262* | (2006.01) |
| *H04N 5/445* | (2011.01) |

(52) U.S. Cl.
CPC ....... *H04N 5/2624* (2013.01); *H04N 5/44591* (2013.01); *H04N 5/64* (2013.01); *H04N 7/0117* (2013.01)

(58) Field of Classification Search
CPC .... H04N 5/2624; H04N 5/44591; H04N 5/64; H04N 7/0117
See application file for complete search history.

(56) References Cited

U.S. PATENT DOCUMENTS

| | | | |
|---|---|---|---|
| 7,602,820 B2 | 10/2009 | Helms et al. | |
| 8,335,433 B2* | 12/2012 | Heywood | H04J 14/02 398/135 |
| 8,369,399 B2 | 2/2013 | Egnal et al. | |
| 2005/0068992 A1 | 3/2005 | Kaku et al. | |
| 2006/0067362 A1 | 3/2006 | Ramakrishnan | |
| 2006/0107294 A1* | 5/2006 | Rivlin | G11B 27/031 725/80 |

* cited by examiner

*Primary Examiner* — Michael E Teitelbaum
(74) *Attorney, Agent, or Firm* — IP Delta Plus Inc.

(57) ABSTRACT

A system comprising cascaded standardized hot-pluggable transceiving units for providing scaling and positioning functionalities. A first layer comprises a plurality of transceiving units implementing a scaling functionality followed by a pre-positioning functionality. A second layer comprises a transceiving unit implementing a scaling functionality followed by a positioning functionality. Source video streams are scaled by the first layer, and further combined to generate primary mosaiced video streams. The primary mosaiced video streams are scaled and combined by the second layer to generate a secondary mosaiced video stream. Alternatively, the first layer comprises at least one transceiving unit only implementing the scaling functionality. Source video streams are scaled by the first layer to generate primary scaled video streams. The primary scaled video streams are scaled and combined by the second layer to generate a mosaiced video stream.

20 Claims, 27 Drawing Sheets

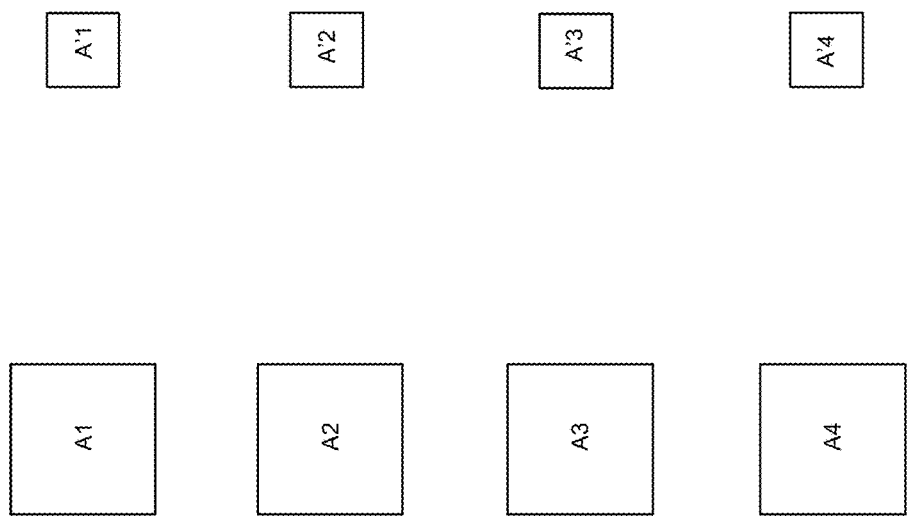

| A | | |
|---|---|---|
| A'1 | A'2 | |
| A'3 | A'4 | |

| B | | |
|---|---|---|
| B'1 | B'2 | |
| B'3 | B'4 | |

| C | | |
|---|---|---|
| C'1 | C'2 | |
| C'3 | C'4 | |

| D | | |
|---|---|---|
| D'1 | D'2 | |
| D'3 | D'4 | |

Figure 8B

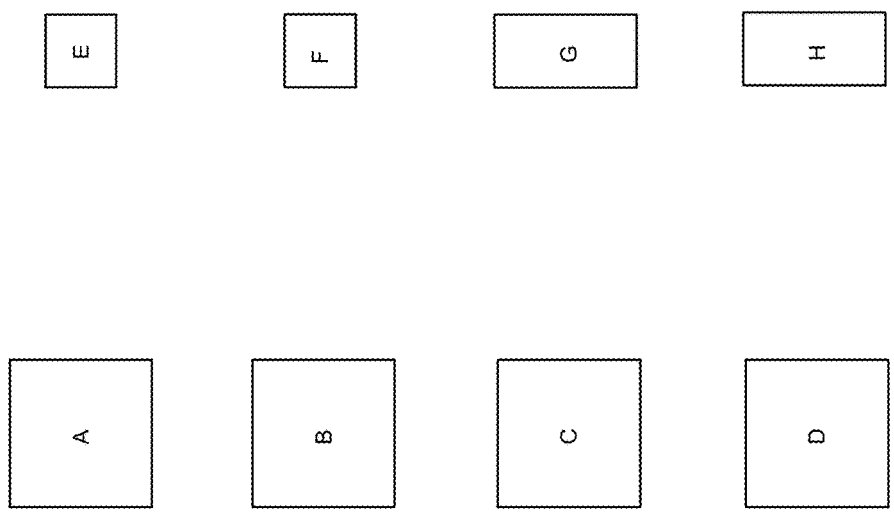

Figure 12C

|  | A''2 | A''3 |
|---|---|---|
| A''1 | B''1 | B''2 |

CASCADED STANDARDIZED HOT-PLUGGABLE TRANSCEIVING UNITS PROVIDING SCALING AND POSITIONING FUNCTIONALITIES

TECHNICAL FIELD

The present disclosure relates to the field of standardized hot-pluggable transceiving units. More specifically, the present disclosure relates to cascaded standardized hot-pluggable transceiving units providing scaling and positioning functionalities.

BACKGROUND

Small Form-factor Pluggable (SFP) units represent one example of standardized hot-pluggable transceiving units. SFP units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at the SFF Committee website.

SFP units may be used with various types of exterior connectors, such as coaxial connectors, optical connectors, RJ45 connectors and various other types of electrical connectors. In general, an SFP unit allows connection between an external apparatus, via a front connector of one of the aforementioned types, and internal components of a hosting unit, for example a motherboard, a card or a backplane leading to further components, via a back interface of the SFP unit. Specification no INF-8074i Rev 1.0, entitled "SFP (Small Form-factor Pluggable) Transceiver, dated May 12, 2001, generally describes sizes, mechanical interfaces, electrical interfaces and identification of SFP units.

The SFF Committee also produced specification no SFF-8431 Rev. 4.1, "Enhanced Small Form-factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a hosting unit, the hosting unit in turn exchanging signals with external apparatuses via SFP devices.

Recently, SFP units with internal features and functions providing signal processing capabilities have appeared. For instance, some SFP units now include signal re-clocking, signal reshaping or reconditioning, signals combination or separation, signal monitoring, etc.

In the field of video transport, advances have been made recently for transporting the payload of a video signal into Internet Protocol (IP) packets (e.g. Serial Digital Interface (SDI) video payloads encapsulated into IP packets). Furthermore, an SFP unit can be adapted to receive the IP flows transporting the video payloads, and to process the video payloads.

One issue with the transport of video IP flows on an IP networking infrastructure is that video IP flows generally require a subsequent amount of bandwidth (which can lead to network congestion), and are very sensitive to delays. The currently deployed IP based video distribution infrastructures do not always make usage of the available bandwidth in an optimized manner.

For example, a plurality of source video streams is transported at full resolution via a corresponding plurality of video IP flows. An equipment (e.g. a multiviewer) receives the plurality of source video streams transmitted at full resolution, scales down the plurality of source video streams to a lower resolution, further combines the plurality of scaled video streams into a mosaiced video stream, and displays the mosaiced video stream into a monitoring window. The plurality of source video streams is transported at full resolution from their source to the destination equipment (e.g. the multiviewer), which represents a significant load burden on the underlying IP networking infrastructure. A more efficient way to proceed would be to implement the multiviewer functionality (the combination of the scaling and mosaicing (also referred to as positioning) sub-functionalities) at an intermediate equipment, such as an IP switch or a router, to save bandwidth between the intermediate equipment and the destination equipment. However, current IP switches or routers are not adapted for implementing the multiviewer functionality (the combination of the scaling and mosaicing (also referred to as positioning) sub-functionalities).

Therefore, there is a need for a new system comprising cascaded standardized hot-pluggable transceiving units providing scaling and positioning functionalities.

SUMMARY

According to a first aspect, the present disclosure provides a system comprising a plurality of primary standardized hot-pluggable transceiving units and a secondary standardized hot-pluggable transceiving unit. The plurality of primary transceiving units respectively comprises a housing having standardized dimensions and adapted to being inserted into a chassis of a hosting unit. The plurality of primary transceiving units respectively comprises at least one connector for receiving a plurality of source video streams. The plurality of primary transceiving units respectively comprises at least one processing unit in the housing for scaling the plurality of source video streams into a corresponding plurality of scaled video streams, mosaicing the plurality of scaled video streams into a primary mosaiced video stream, and outputting the primary mosaiced video stream via one of: the at least one connector or another connector of the plurality of primary transceiving units. The secondary transceiving unit comprises a housing having standardized dimensions and adapted to being inserted into a chassis of a hosting unit. The secondary transceiving unit comprises at least one connector for receiving the primary mosaiced video streams from the plurality of primary transceiving units. The secondary transceiving unit comprises at least one processing unit in the housing for scaling the primary mosaiced video streams into corresponding scaled primary mosaiced video streams, mosaicing the scaled primary mosaiced video streams into a secondary mosaiced video stream, and outputting the secondary mosaiced video stream via one of: the at least one connector or another connector of the secondary transceiving unit.

According to a second aspect, the present disclosure provides a system comprising at least one primary standardized hot-pluggable transceiving unit and a secondary standardized hot-pluggable transceiving unit. The at least one primary transceiving unit comprises a housing having standardized dimensions and adapted to being inserted into a chassis of a hosting unit. The at least one primary transceiving unit comprises at least one connector for receiving a plurality of source video streams. The at least one primary transceiving unit comprises at least one processing unit in the housing for scaling the plurality of source video streams into a corresponding plurality of primary scaled video streams, and outputting the plurality of primary scaled video streams via one of: the at least one connector or another connector of the at least one primary transceiving unit. The secondary transceiving unit comprises a housing having standardized dimensions and adapted to being inserted into a chassis of a hosting unit. The secondary transceiving unit comprises at least one connector for receiving the plurality of primary scaled video streams from the at least one primary transceiving unit. The secondary transceiving unit comprises at least one processing unit in the housing for scaling the plurality of primary scaled video streams into a corresponding plurality of secondary scaled video streams, mosaicing the plurality of secondary scaled video streams into a mosaiced video stream, and outputting the mosaiced video stream via one of: the at least one connector or another connector of the secondary transceiving unit.

According to a third aspect, the present disclosure provides a system comprising a plurality of primary standardized hot-pluggable transceiving units and a secondary standardized hot-pluggable transceiving unit. The plurality of primary transceiving units respectively comprises a housing having standardized dimensions and adapted to being inserted into a chassis of a hosting unit. The plurality of primary transceiving units respectively comprises at least one connector for receiving a plurality of scaled video streams. The plurality of primary transceiving units respectively comprises at least one processing unit in the housing for mosaicing the plurality of scaled video streams into a primary mosaiced video stream, and outputting the primary mosaiced video stream via one of: the at least one connector or another connector of the plurality of primary transceiving units. The secondary transceiving unit comprises a housing having standardized dimensions and adapted to being inserted into a chassis of a hosting unit. The secondary transceiving unit comprises at least one connector for receiving the primary mosaiced video streams from the plurality of primary transceiving units. The secondary transceiving unit comprises at least one processing unit in the housing for scaling the primary mosaiced video streams into corresponding scaled primary mosaiced video streams, mosaicing the scaled primary mosaiced video streams into a secondary mosaiced video stream, and outputting the secondary mosaiced video stream via one of: the at least one connector or another connector of the secondary transceiving unit.

BRIEF DESCRIPTION OF THE DRAWINGS

Embodiments of the disclosure will be described by way of example only with reference to the accompanying drawings, in which:

FIG. 8A illustrates a scaling functionality implemented by a first layer of the system of FIG. 7;
FIG. 8B illustrates a pre-positioning functionality implemented by the first layer of the system of FIG. 7;
FIG. 8C illustrates a scaling functionality implemented by a second layer of the system of FIG. 7;
FIG. 12C illustrates a positioning functionality implemented by the second layer of the system of FIG. 11.

DETAILED DESCRIPTION

Figure 1:
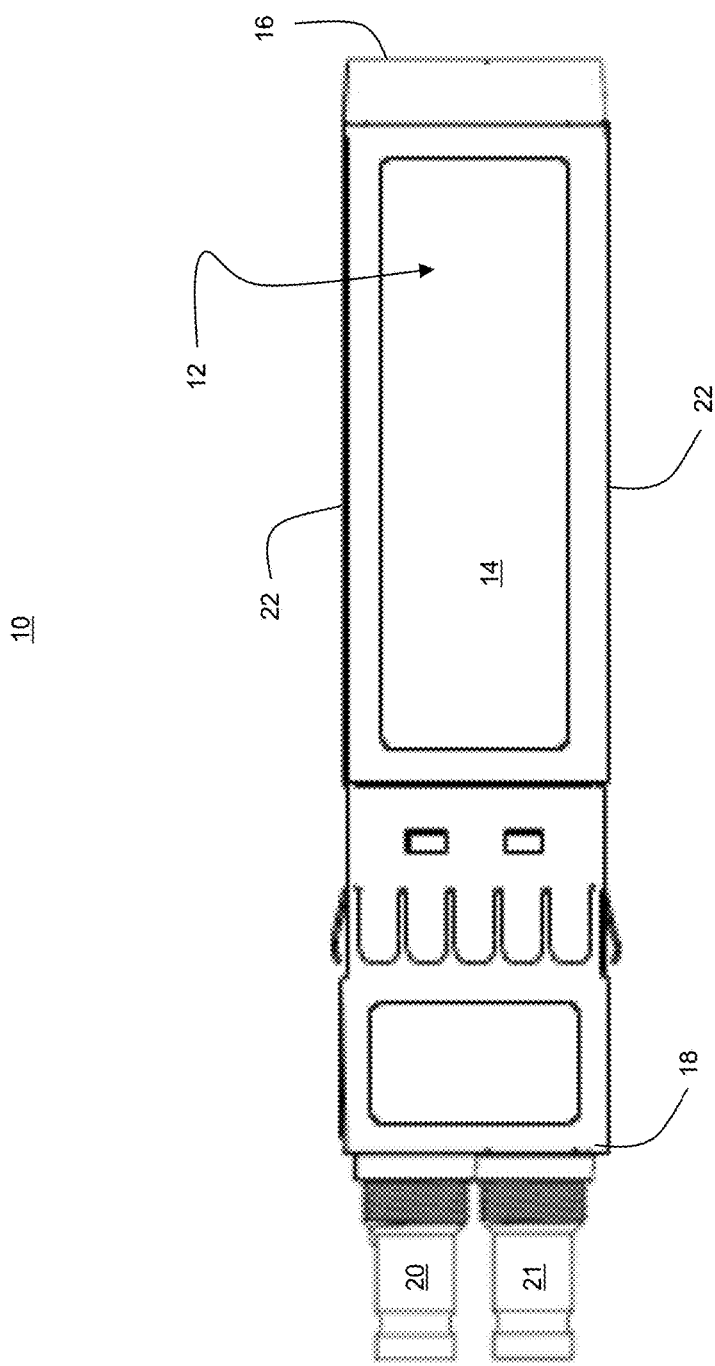
FIG. 1 is a top view of an SFP unit.
Figure 2:
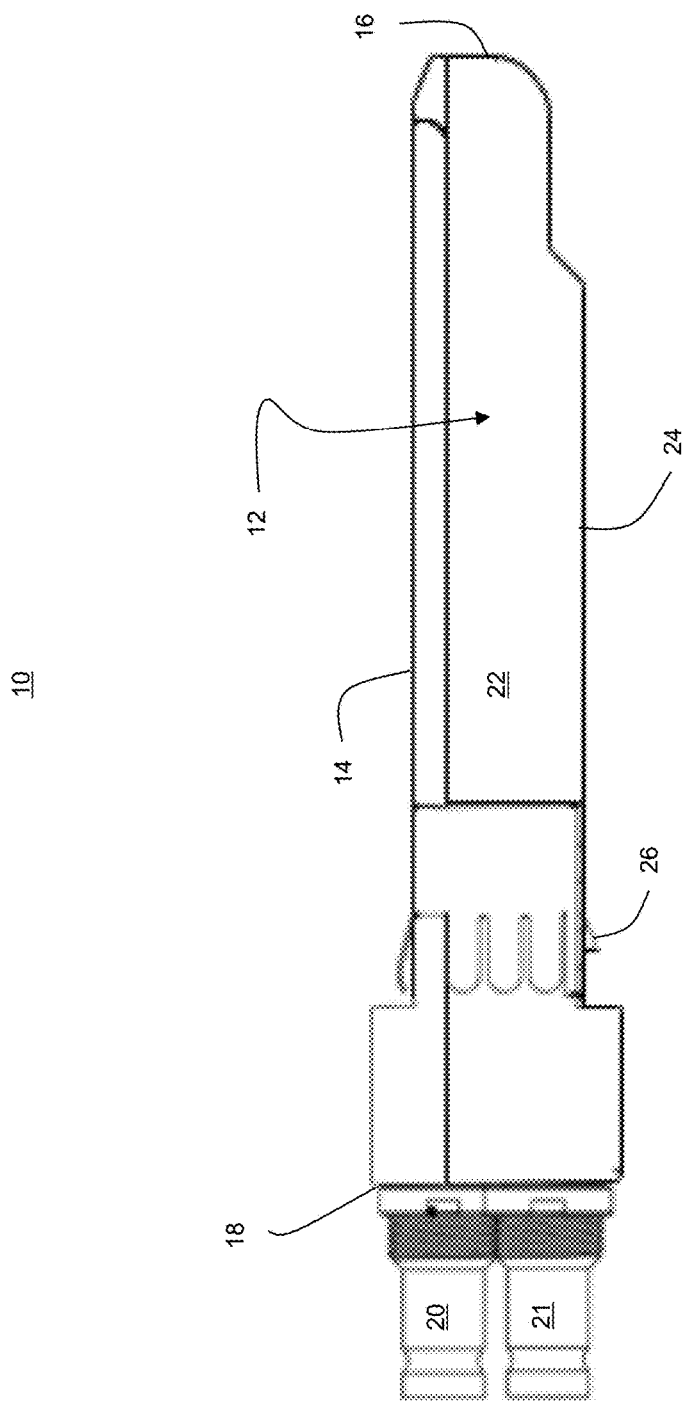
FIG. 2 is a side elevation view of the SFP unit of FIG. 1.
Figure 4:
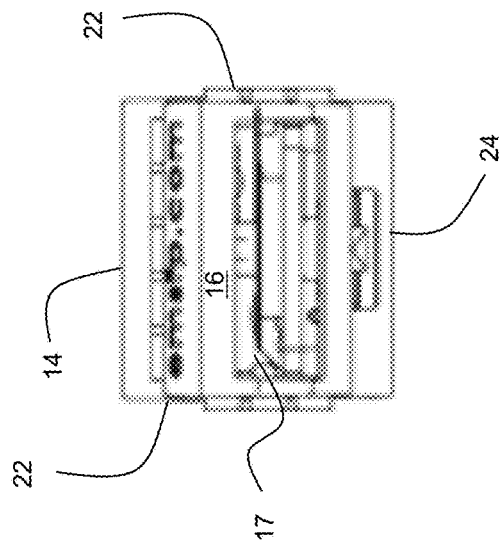
FIG. 4 is back elevation view of the SFP unit of FIG. 1.
Figure 3:
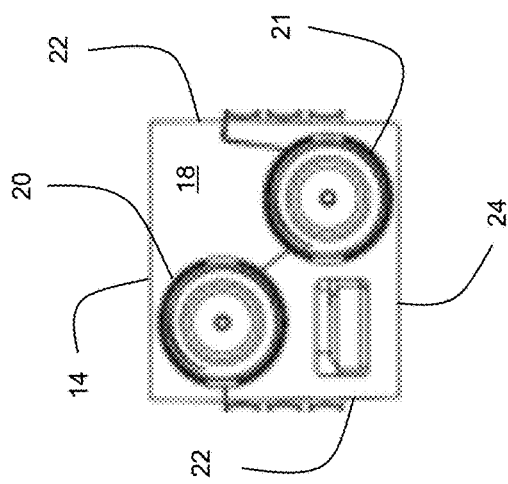
FIG. 3 is a front elevation view of the SFP unit of FIG. 1.
Figure 5:
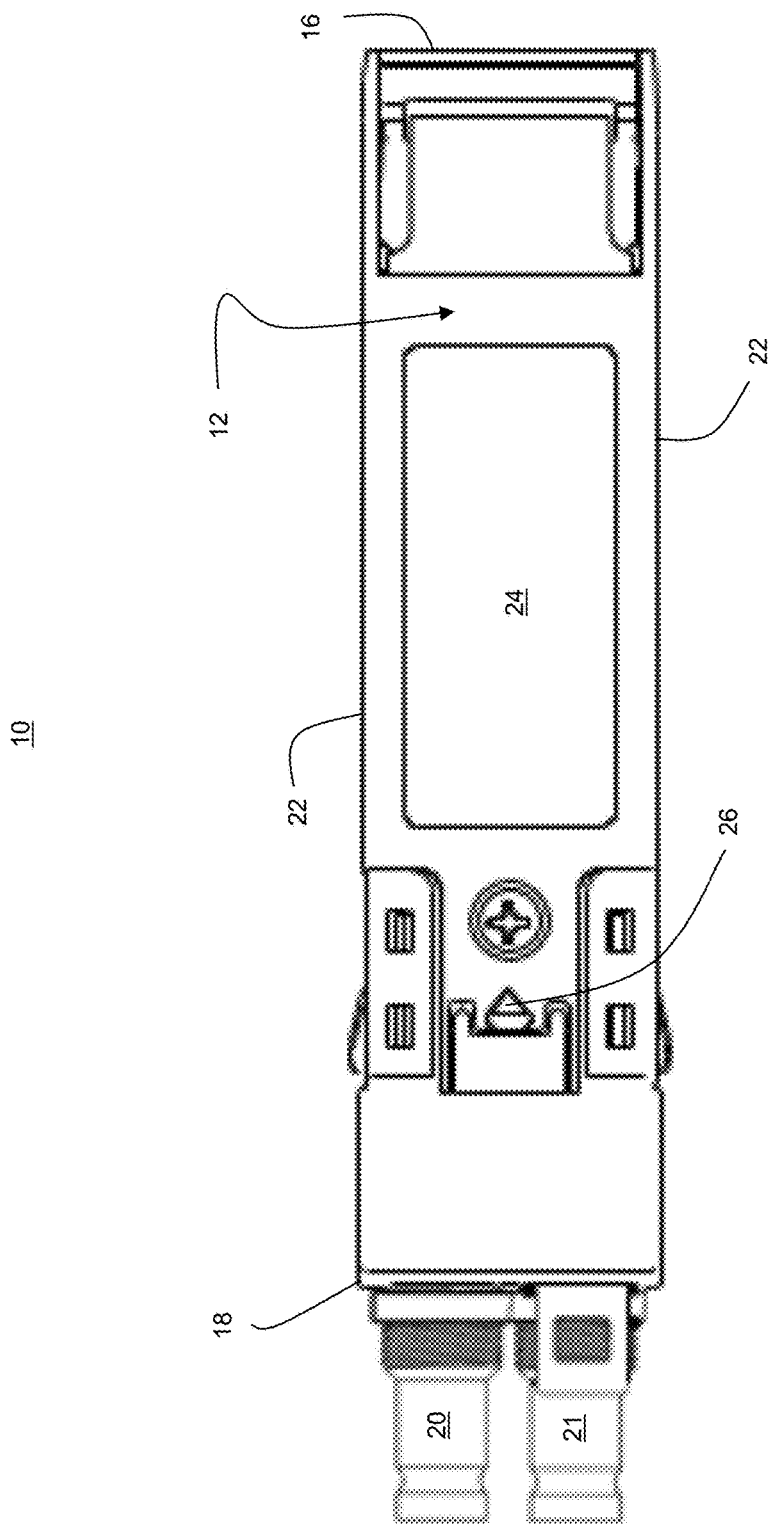
FIG. 5 is a bottom view of the SFP unit of FIG. 1.
Figure 6:
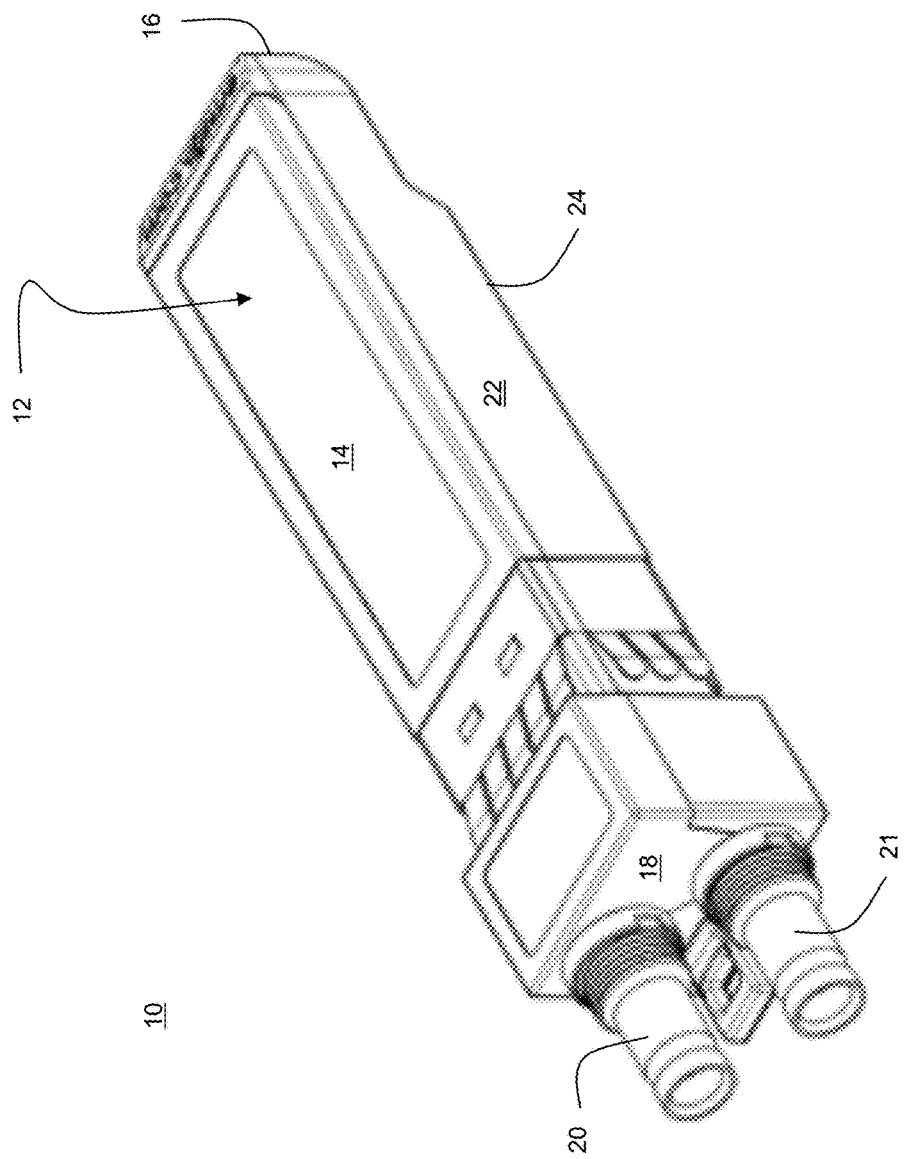
FIG. 6 is a perspective view of the SFP unit of FIG. 1.

The foregoing and other features will become more apparent upon reading of the following non-restrictive description of illustrative embodiments thereof, given by way of example only with reference to the accompanying drawings.

The present disclosure describes standardized hot-pluggable transceiving units, such as Small Form-factor Pluggable (SFP)/SFP+ units, having internal features that far exceed those of conventional units. While conventional units merely provide connection capabilities between a hosting unit in which they are inserted and external apparatuses, the standardized hot-pluggable transceiving units disclosed herein provide the capability of processing and combining received video streams, in order to generate a resulting mosaiced video stream for display on a multiviewer.

The following terminology is used throughout the present disclosure:
SFP: Small Form-factor Pluggable, this term refers to units that are insertable into a chassis of a hosting unit; in the present disclosure, an SFP unit complies with an industry standard specification.

Connector: A device component for physically joining circuits carrying electrical, optical, radio-frequency, or like signals.

Video signal: Analog or digital signal usable for display purposes, either directly on a monitor, or through multicast or broadcast.

In the rest of the disclosure, an SFP unit is used to illustrate an example of a standardized hot-pluggable transceiving unit. However, the teachings of the present disclosure are not limited to an SFP unit, and can be applied to any type of standardized hot-pluggable transceiving unit.

An SFP unit comprises a housing having a front panel, a back panel, a top, a bottom and two sides. Generally, the front panel includes at least one front connector for connecting a cable, a fiber, twisted pairs, etc. The back panel includes at least one rear connector for connecting to a hosting unit. However, as will be illustrated later in the present disclosure, the SFP unit may have no front connector, or alternatively no rear connector. The SFP unit may be fully-compliant or partially compliant with standardized SFP dimensions, such as SFP, SFP+, XFP (SFP with 10 Gigabit/s data rate), Xenpak, QSFP (Quad (4-channel) SFP with 4×10 Gigabit/s data rate), QSFP+, CFP (C form-factor pluggable with 100 Gigabit/s data rate), CPAK or any other standardized Small Form-factor Pluggable unit. Consequently, in the context of the present disclosure, an SFP unit may correspond to SFP, SFP+, XFP, Xenpak, QSFP, QSFP+, CFP, CPAK, or any other known standards related to Small Form-factor Pluggable units.

Reference is now made concurrently to FIGS. 1-6, which are, respectively, a top view, a side elevation view, a front elevation view, a back elevation view, a bottom view and a perspective view of an SFP unit 10. The SFP unit 10 comprises a housing 12. The housing defines a top 14, a bottom 24, and two sides 22. The housing 12 may be at least partially of dimensions in compliance with at least one of the following standards: SFP, SFP+, XFP, Xenpak, QSFP, QSFP+, CFP, CPAK, etc. Alternatively, the housing 12 has functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 comprises a rear connector 17, for instance an electrical or an optical connector. In an example, the back panel comprises the rear connector 17 (also named a host connector) suitable to connect the SFP unit 10 to a backplane of a chassis (not shown for clarity purposes) of a hosting unit, as known to those skilled in the art.

The SFP unit 10 further comprises a front panel 18 affixed to the housing 12. The front panel 18 comprises one or more connectors, for example a connector 20 of a co-axial cable type such as SDI, adapted to send and/or receive a digital video signal and a connector 21, also of the co-axial cable type, adapted to send and/or receive a digital data signal. The SFP unit 10 further comprises an engagement mechanism, such as for example a latch 26 as shown in a resting position on the bottom 24 in FIG. 2, for maintaining the SFP unit 10 in place within a chassis.

Figure 7:
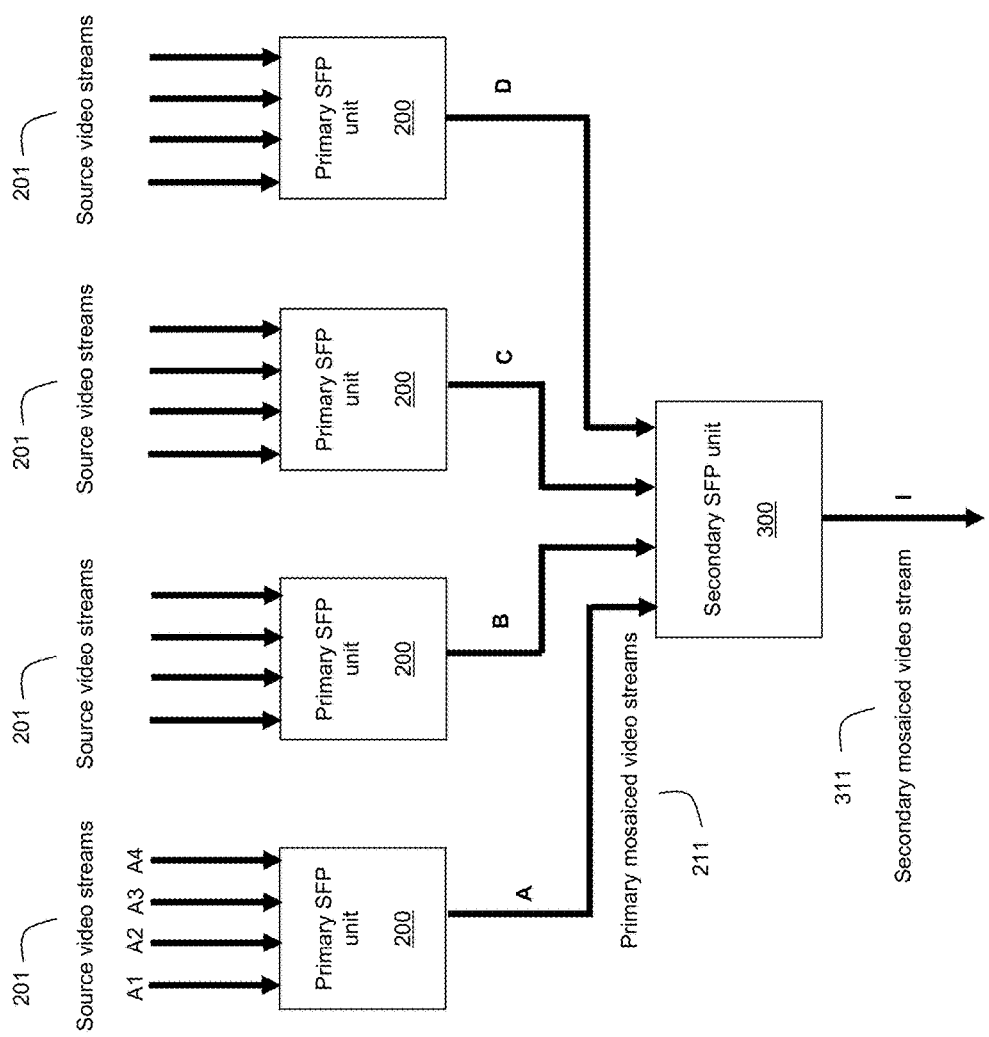
FIG. 7 represents a first implementation of a system comprising cascaded standardized hot-pluggable transceiving units for providing scaling and positioning functionalities.

Referring now to FIG. 7, a first implementation of a system comprising cascaded standardized hot-pluggable transceiving units for providing scaling and positioning functionalities is represented. As mentioned previously, for illustration purposes, the standardized hot-pluggable transceiving units consist of SFP units; but other types of standardized hot-pluggable transceiving units may be used for implementing the system.

The system comprises a plurality of primary SFP units 200, and a secondary SFP unit 300. For illustration purposes, four primary SFP units 200 are represented in FIG. 7. However, the number of primary SFP units 200 used by the system may vary. The first layer comprising the plurality of primary SFP units 200 is cascaded into the second layer comprising the secondary SFP unit 300.

Each one of the plurality of primary SFP units 200 receives a plurality of source video streams 201, which are processed by the primary SFP unit 200 to generate and output a primary mosaiced video stream 211. For illustration purposes, four source video streams 201 are received by each primary SFP unit 200 in FIG. 7. However, the number of source video streams 201 received by each primary SFP unit 200 may vary, and may differ from one primary SFP unit 200 to another. As will be illustrated later in the description, each primary SFP unit 200 implements a scaling functionality and a pre-positioning functionality for generating the outputted primary mosaiced video stream 211 based on the received source video streams 201.

The secondary SFP unit 300 receives the plurality of primary mosaiced video stream 211 generated and outputted by the plurality of primary SFP units 200. The secondary SFP unit 300 processes the plurality of primary mosaiced video stream 211 to generate and output a secondary mosaiced video stream 311. As will be illustrated later in the description, the secondary SFP unit 300 implements a scaling functionality and a positioning functionality for generating the outputted secondary mosaiced video stream 311 based on the received primary mosaiced video streams 211.

Figure 8D:
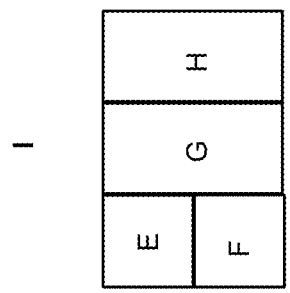
FIG. 8D illustrates a positioning functionality implemented by the second layer of the system of FIG. 7.

Reference is now made concurrently to FIGS. 7, 8A, 8B, 8C and 8D; where FIG. 8A illustrates the scaling functionality implemented by the primary SFP units 200, FIG. 8B illustrates the pre-positioning functionality implemented by the primary SFP units 200, FIG. 8C illustrates the scaling functionality implemented by the secondary SFP units 300, and FIG. 8D illustrates the positioning functionality implemented by the secondary SFP unit 300.

Referring more particularly to FIGS. 7 and 8A, the source video streams 201 received by the primary SFP unit 200 located on the left of FIG. 7 are respectively labelled A1, A2, A3 and A4. The scaling functionality implemented by the primary SFP unit 200 scales the source video streams A1, A2, A3 and A4 into corresponding scaled video streams respectively labelled A'1, A'2, A'3 and A'4. FIG. 8A illustrates a horizontal scaling factor of ½ and a vertical scaling factor of ½ applied to the source video streams A1, A2, A3 and A4 to generate the scaled video streams A'1, A'2, A'3 and A'4. FIG. 8A is for illustration purposes only. Different values of scaling factors may be applied to each one of the source video streams (e.g. A1, A2, A3 and A4) received by each one of the plurality of primary SFP units 200, and the values of the scaling factors may differ from one source video stream to another.

The operation consisting in scaling a source video stream into a corresponding scaled video stream is well known in the art. The source video stream transports a plurality of source video frames and the corresponding scaled video stream transports a corresponding plurality of scaled video frames. For each source video frame, a corresponding scaled video frame is generated. The generation of the scaled video stream comprises generating the plurality of scaled video frames by applying the scaling ratio to the corresponding plurality of source video frames.

Additional data (e.g. an audio payload, a metadata payload, a combination thereof, etc.) included in the source video stream, and not consisting of the source video frames, are included into the scaled video stream, and optionally modified if appropriate. The metadata payload comprises at least one of the following: closed caption text, subtitle text, rating text, a time code (e.g. for indicating a time interval before a program goes live), a Vertical Blanking Interval (VBI), V-chip rating, etc. Alternatively, the audio payload and/or the metadata payload are transported independently of the video streams, and are not processed by the scaling functionality. Furthermore, additional information related to the scaling operation not included in the source video stream may be included in the scaled video stream (for instance, the value of the scaling ratio).

Various scaling ratios can be applied by the scaling functionality. In particular, the scaling ratio consists of a single ratio applied to both the length and the width of the plurality of source video frames. Alternatively, the scaling ratio consists of a combination of a horizontal ratio and a vertical ratio applied respectively to the length and the width of the plurality of source video frames. The values of the single ratio, horizontal ratio and vertical ratio are generally expressed as 1/N where N is an integer.

For example, if the source video stream transports source video frames having a resolution of 1024×1024 and the scaling ratio is a single ratio of ½, the scaled video stream comprises scaled video frames having a resolution of 512× 512. If the scaling ratio comprises a horizontal ratio of ½ and a vertical ratio of ¼, the scaled video stream comprises scaled video frames having a resolution of 512×256.

The scaling operation is also usually referred to as spatial scaling, and consists in reducing the number of pixels in the source video frames to generate the scaled video frames, so that the bandwidth required for transmitting the scaled video frames is reduced accordingly. For instance, a basic algorithm for applying a scaling ratio comprising a horizontal ratio of ½ and a vertical ratio of ¼ consists in keeping every two pixels in the lines of the source video frames and every 4 pixels in the columns of the source video frames. More sophisticated algorithms can be implemented for preserving the quality of the resulting scaled video frames.

Alternatively or complementarily, the scaling operation may also consist in a temporal scaling. For instance, if the multiviewer functionality implemented by the system represented in FIG. 7 is used just for confidence monitoring, and does not need to be fluid and to operate in real time, the frame rate is scaled down instead of applying a spatial scaling, and a few images per second are transmitted instead of a real-time frame rate of 50-60 images per second.

Referring more particularly to FIGS. 7 and 8B, the pre-positioning functionality of each primary SFP unit 200 processes the plurality of scaled video streams to generate the corresponding primary mosaiced video streams. The primary mosaiced video streams generated by the four primary SFP units 200 of FIG. 7 are respectively labelled A, B, C and D. FIG. 8B illustrates the positioning of the four scaled video streams A'1, A'2, A'3 and A'4 generated by the first primary SFP unit 200 of FIG. 7 to generate the corresponding primary mosaiced video stream A, the positioning of the four scaled video streams B'1, B'2, B'3 and B'4 generated by the second primary SFP unit 200 of FIG. 7 to generate the corresponding primary mosaiced video stream B, the positioning of the four scaled video streams C'1, C'2, C'3 and C'4 generated by the third primary SFP unit 200 of FIG. 7 to generate the corresponding primary mosaiced video stream C, and the positioning of the four scaled video streams D'1, D'2, D'3 and D'4 generated by the fourth primary SFP unit 200 of FIG. 7 to generate the corresponding primary mosaiced video stream D. The scaled video streams are not represented in FIG. 7 for simplification purposes.

The operation consisting in generating a mosaiced video stream based on a plurality of scaled video streams is well known in the art. Each one of the plurality of scaled video streams transports a plurality of scaled video frames and the corresponding mosaiced video stream transports a corresponding plurality of mosaiced video frames. Each mosaiced video frame is generated by combining scaled video frames respectively transported by each one of the plurality of scaled video streams at respective given positions within the mosaiced video frame. For instance, FIG. 8B illustrates the mosaiced video frames A generated by combining the scaled video frames A'1, A'2, A'3, A'4, these scaled video frames being respectively positioned at the upper left, upper right, lower left and lower right positions within mosaiced video frames A.

Additional data (e.g. an audio payload, a metadata payload, a combination thereof, etc.) included in the scaled video streams, and not consisting of the scaled video frames, are included into the mosaiced video stream, and optionally modified if appropriate. The metadata payload comprises at least one of the following: closed caption text, subtitle text, rating text, a time code (e.g. for indicating a time interval before a program goes live), a Vertical Blanking Interval (VBI), V-chip rating, etc. Alternatively, the audio payload and/or the metadata payload are transported independently of the video streams, and are not processed by the pre-positioning functionality. Furthermore, additional information related to the pre-positioning operation not included in the scaled video streams may be included in the mosaiced video stream (for instance, an identification of the scaled video streams and their respective position within the mosaiced video stream).

Referring more particularly to FIGS. 7 and 8C, the primary mosaiced video streams 211 (labelled A, B, C and D) are received by the secondary SFP unit 300 from the primary SFP units 200. The scaling functionality implemented by the secondary SFP unit 300 scales the primary mosaiced video streams A, B, C and D into corresponding scaled primary mosaiced video streams respectively labelled E, F, G and H.

FIG. 8C illustrates a horizontal scaling factor of ½ and a vertical scaling factor of ½ applied to the primary mosaiced video streams A and B to generate the corresponding scaled primary mosaiced video streams E and F. A horizontal scaling factor of ½ and a vertical scaling factor of 1 is applied to the primary mosaiced video streams C and D to generate the corresponding scaled primary mosaiced video streams G and H. FIG. 8C is for illustration purposes only. Different values of scaling factors may be applied to each one of the primary mosaiced video streams A, B, C and D; and the values of the scaling factors may differ from one primary mosaiced video stream (e.g. A, B) to another (e.g. C, D).

The operation consisting in generating the plurality of scaled primary mosaiced video streams based on the plurality of primary mosaiced video streams is functionally equivalent to the previously described operation consisting in generating the plurality of scaled video streams based on the plurality of source video streams (illustrated in FIG. 8A).

Referring more particularly to FIGS. 7 and 8D, the positioning functionality of the secondary SFP unit 300 processes the plurality of scaled primary mosaiced video streams E, F, G and H to generate the secondary mosaiced video stream 311 (labelled I). FIG. 8D illustrates the positioning of the scaled primary mosaiced video streams E, F, G and H generated by the secondary SFP unit 300 of FIG. 7 to generate the corresponding secondary mosaiced video stream I.

The operation consisting in generating the secondary mosaiced video stream based on the plurality of scaled primary mosaiced video streams is functionally equivalent to the previously described operation consisting in generating each primary mosaiced video stream based on the plurality of scaled video streams (illustrated in FIG. 8B).

For instance, FIG. 8D illustrates the secondary mosaiced video frame I generated by combining the scaled primary mosaiced video frames E, F, G, H; these scaled primary mosaiced video frames being respectively positioned at the upper left, lower left, middle and right positions within the mosaiced video frame I.

Figure 9A:
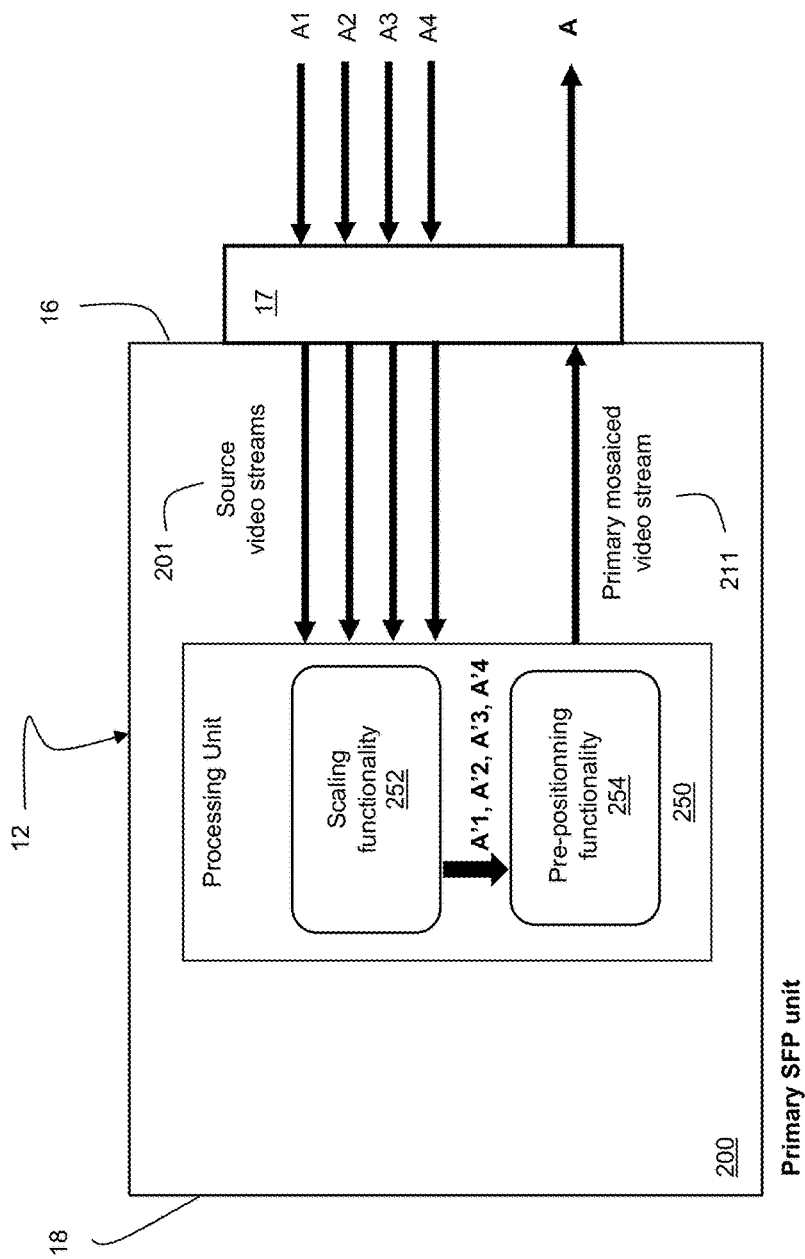
FIGS. 9A and 9B illustrate a primary SFP unit of the system of FIG. 7.

Reference is now made concurrently to FIGS. 7, 8A, 8B and 9A; where FIG. 9A illustrates a first configuration of the primary SFP unit 200. The primary SFP unit 200 corresponds to the SFP unit 10 represented in FIGS. 1 to 6, and comprises the housing 12, the back panel 16 and the front panel 18.

The primary SFP unit 200 has a rear connector 17 on the back panel 16, and receives the source video streams 201 (A1, A2, A3 and A4) via the rear connector 17.

The primary SFP unit 200 comprises at least one processing unit 250 (only one processing unit 250 is represented on FIG. 9A for simplification purposes). The at least one processing unit 250 executes the aforementioned scaling functionality 252 and pre-positioning functionality 254.

The scaling functionality 252 processes the received source video streams A1, A2, A3 and A4 for respectively scaling the source video streams A1, A2, A3 and A4 into the scaled video streams A'1, A'2, A'3 and A'4.

The pre-positioning functionality 254 processes the scaled video streams A'1, A'2, A'3 and A'4 for mosaicing the scaled video streams A'1, A'2, A'3 and A'4 into the primary mosaiced video stream 211 (A). The primary mosaiced video stream 211 (A) is outputted via the rear connector 17.

The primary SFP unit 200 does not have any front connector on the front panel 18, since all the data are exchanged via the rear connector 17. Alternatively, the primary SFP unit 200 may have one or more front connectors on the front panel 18, for exchanging additional data and performing a processing of these additional data which is out of the scope of the present disclosure.

Figure 9B:
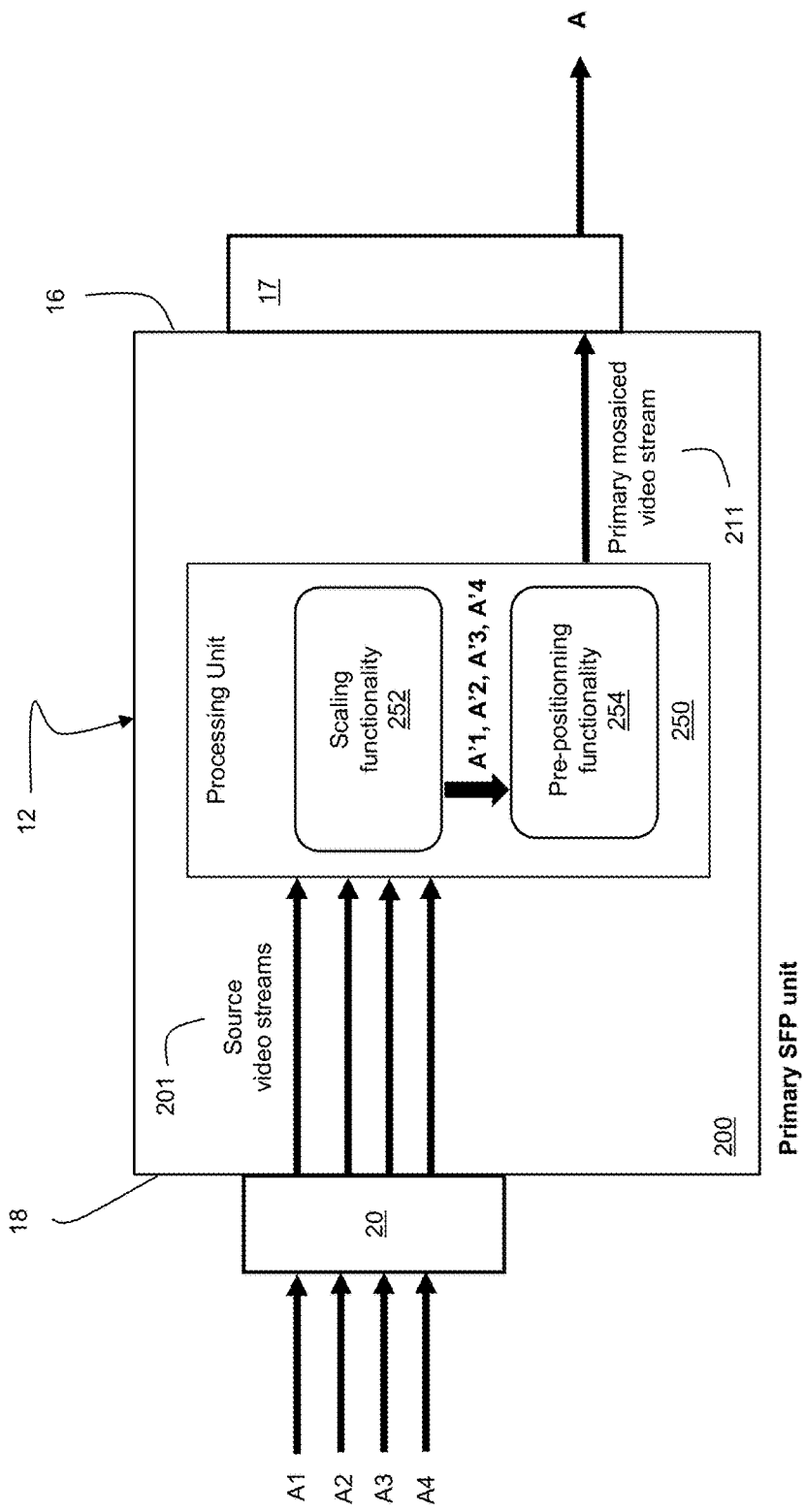

Reference is now made concurrently to FIGS. 7, 8A, 8B and 9B; where FIG. 9B illustrates a second configuration of the primary SFP unit 200. The primary SFP unit 200 corresponds to the SFP unit 10 represented in FIGS. 1 to 6, and comprises the housing 12, the back panel 16 and the front panel 18.

The primary SFP unit 200 has a rear connector 17 on the back panel 16 and a front connector 20 on the front panel 18. The primary SFP unit 200 receives the source video streams 201 (A1, A2, A3 and A4) via the front connector 20.

The primary SFP unit 200 comprises at least one processing unit 250 (only one processing unit 250 is represented on FIG. 9B for simplification purposes). The at least one processing unit 250 executes the aforementioned scaling functionality 252 and pre-positioning functionality 254.

The scaling functionality 252 processes the received source video streams A1, A2, A3 and A4 for respectively scaling the source video streams A1, A2, A3 and A4 into the scaled video streams A'1, A'2, A'3 and A'4.

The pre-positioning functionality 254 processes the scaled video streams A'1, A'2, A'3 and A'4 for mosaicing the scaled video streams A'1, A'2, A'3 and A'4 into the primary mosaiced video stream 211 (A). The primary mosaiced video stream 211 (A) is outputted via the rear connector 17. Alternatively, the primary mosaiced video stream 211 (A) is outputted via the front connector 20 (this configuration is not represented in the Figures for simplification purposes).

The primary SFP unit 200 may have more than one front connector on the front panel 18 (this configuration is not represented in the Figures for simplification purposes). The reception of the source video streams 201 is spread across the plurality of front connectors. For example, the front connector 20 receives the source video streams A1 and A2, and a second front connector not represented in FIG. 9B receives the source video streams A3 and A4. Alternatively, the front connector 20 receives all the source video streams A1, A2, A3 and A4 as illustrated in FIG. 9B, and a second front connector not represented in FIG. 9B outputs the primary mosaiced video stream 211 (A).

In a particular embodiment, the primary SFP unit 200 has four front connectors (Quad SFP) of electrical or optical type with an aggregate bandwidth of at least 40 Gbps.

Figure 10A:
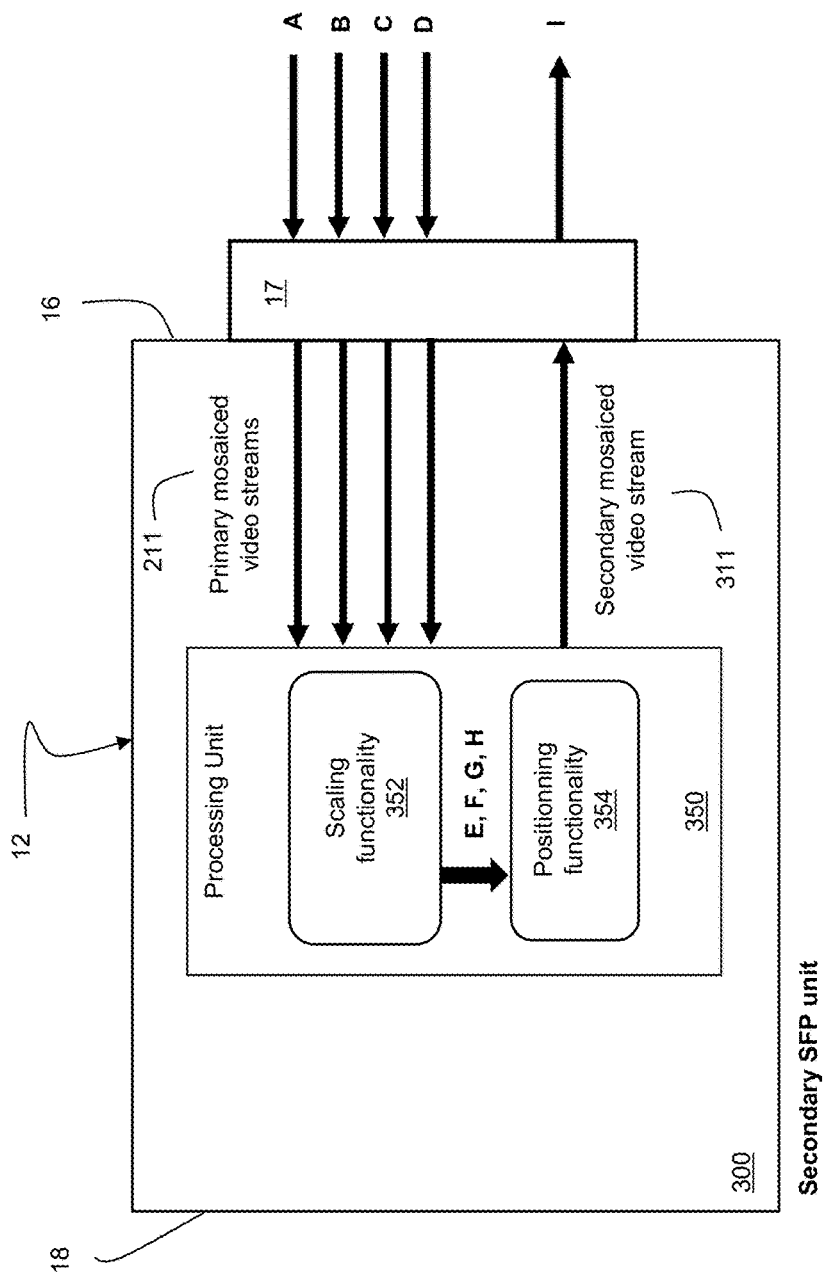
FIGS. 10A, 10B and 10C illustrate a secondary SFP unit of the system of FIG. 7.

Reference is now made concurrently to FIGS. 7, 8C, 8D and 10A; where FIG. 10A illustrates a first configuration of the secondary SFP unit 300. The secondary SFP unit 300 corresponds to the SFP unit 10 represented in FIGS. 1 to 6, and comprises the housing 12, the back panel 16 and the front panel 18.

The secondary SFP unit 300 has a rear connector 17 on the back panel 16, and receives the primary mosaiced video streams 211 (A, B, C and D) via the rear connector 17.

The secondary SFP unit 300 comprises at least one processing unit 350 (only one processing unit 350 is represented on FIG. 10A for simplification purposes). The at least one processing unit 350 executes the aforementioned scaling functionality 352 and positioning functionality 354.

The scaling functionality 352 processes the primary mosaiced video streams 211 (A, B, C and D) for scaling the primary mosaiced video streams 211 (A, B, C and D) into the corresponding scaled primary mosaiced video stream E, F, G, H.

The positioning functionality 354 processes the scaled primary mosaiced video stream E, F, G, H for mosaicing the scaled primary mosaiced video streams E, F, G, H into the secondary mosaiced video stream 311 (I). The secondary mosaiced video stream 311 (I) is outputted via the rear connector 17.

The secondary SFP unit 300 does not have any front connector on the front panel 18, since all the data are exchanged via the rear connector 17. Alternatively, the secondary SFP unit 300 may have one or more front connectors on the front panel 18, for exchanging additional data and performing a processing of these additional data which is out of the scope of the present disclosure.

Figure 10B:
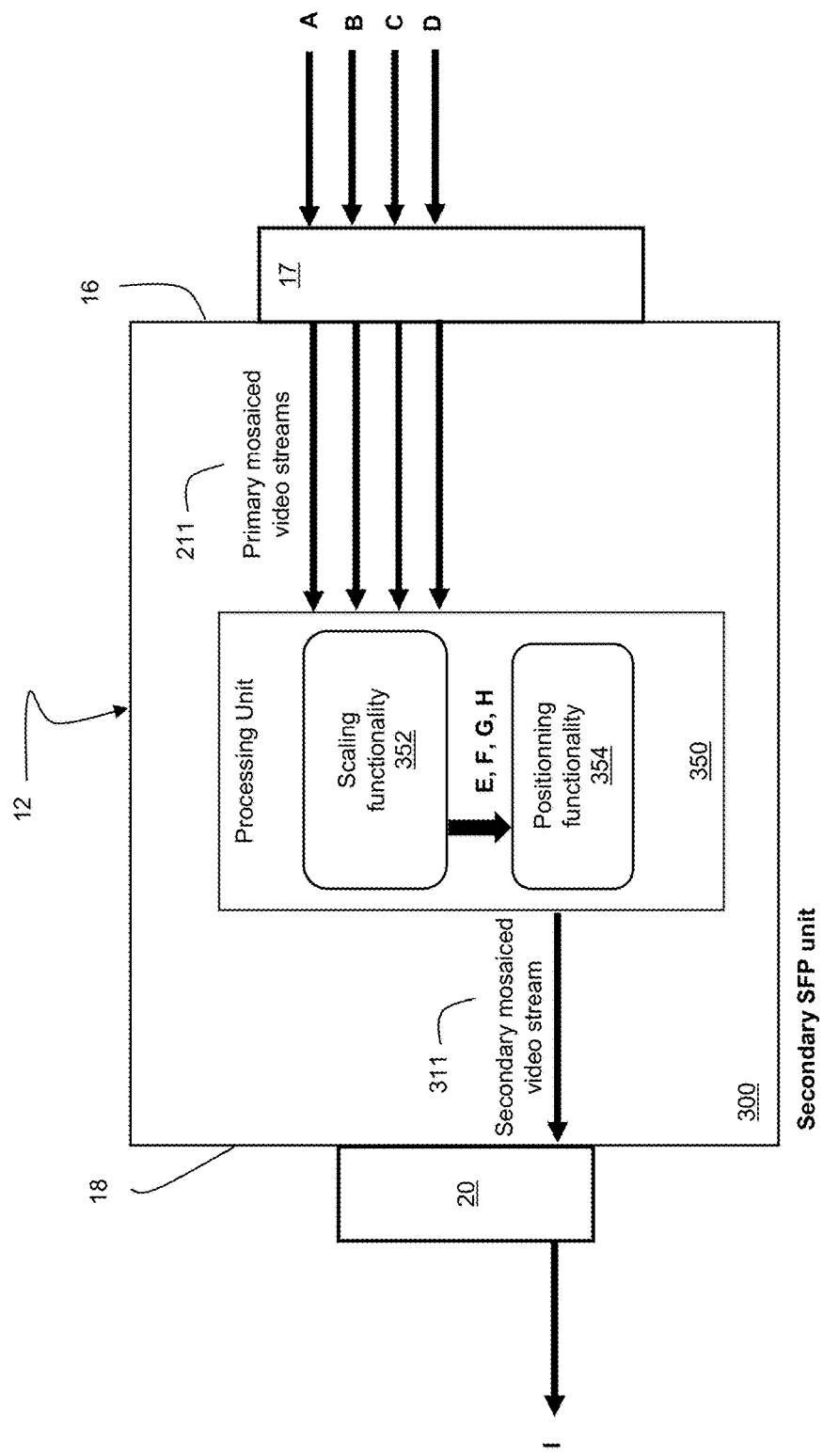

Reference is now made concurrently to FIGS. 7, 8C, 8D and 10B; where FIG. 10B illustrates a second configuration of the secondary SFP unit 300. The secondary SFP unit 300 corresponds to the SFP unit 10 represented in FIGS. 1 to 6, and comprises the housing 12, the back panel 16 and the front panel 18.

The secondary SFP unit 300 has a rear connector 17 on the back panel 16, and a front connector 20 on the front panel 18. The secondary SFP unit 300 receives the primary mosaiced video streams 211 (A, B, C and D) via the rear connector 17.

The secondary SFP unit 300 comprises at least one processing unit 350 (only one processing unit 350 is represented on FIG. 10A for simplification purposes). The at least one processing unit 350 executes the aforementioned scaling functionality 352 and positioning functionality 354.

The scaling functionality 352 processes the primary mosaiced video streams 211 (A, B, C and D) for scaling the primary mosaiced video streams 211 (A, B, C and D) into the corresponding scaled primary mosaiced video stream E, F, G, H.

The positioning functionality 354 processes the scaled primary mosaiced video stream E, F, G, H for mosaicing the scaled primary mosaiced video streams E, F, G, H into the secondary mosaiced video stream 311 (I). The secondary mosaiced video stream 311 (I) is outputted via the front connector 20.

The secondary SFP unit 300 may have more than one front connector on the front panel 18, for exchanging additional data and performing a processing of these additional data which is out of the scope of the present disclosure.

Figure 10C:
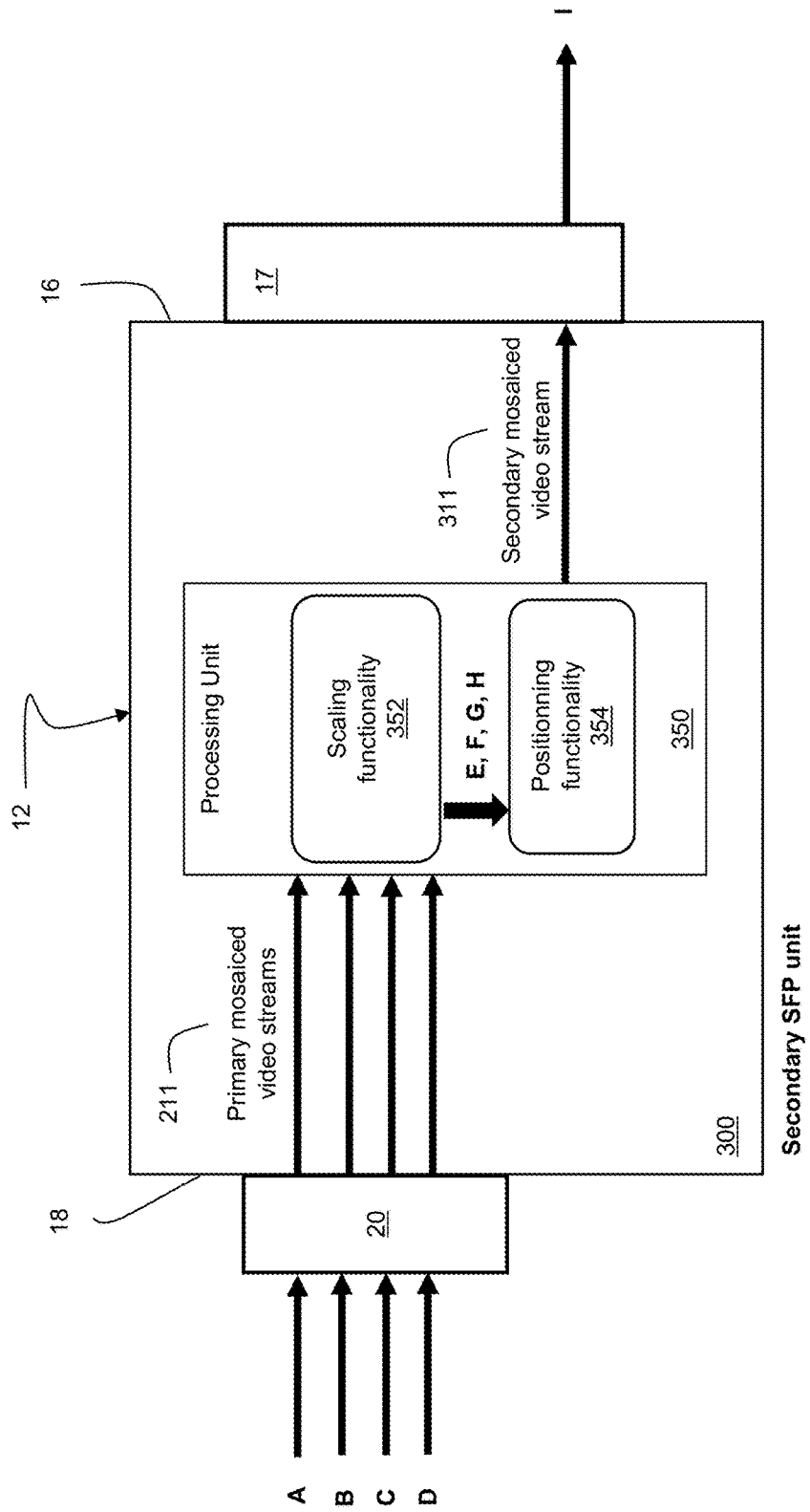

Reference is now made concurrently to FIGS. 7, 8C, 8D and 10C; where FIG. 10C illustrates a third configuration of the secondary SFP unit 300. The secondary SFP unit 300 corresponds to the SFP unit 10 represented in FIGS. 1 to 6, and comprises the housing 12, the back panel 16 and the front panel 18.

The secondary SFP unit 300 has a rear connector 17 on the back panel 16 and a front connector 20 on the front panel 18. The secondary SFP unit 300 receives the primary mosaiced video streams 211 (A, B, C and D) via the front connector 20.

The secondary SFP unit 300 comprises at least one processing unit 350 (only one processing unit 350 is represented on FIG. 10C for simplification purposes). The at least one processing unit 350 executes the aforementioned scaling functionality 352 and positioning functionality 354.

The scaling functionality 352 processes the primary mosaiced video streams 211 (A, B, C and D) for scaling the primary mosaiced video streams 211 (A, B, C and D) into the corresponding scaled primary mosaiced video stream E, F, G, H.

The positioning functionality 354 processes the scaled primary mosaiced video stream E, F, G, H for mosaicing the scaled primary mosaiced video streams E, F, G, H into the secondary mosaiced video stream 311 (I). The secondary mosaiced video stream 311 (I) is outputted via the rear connector 17. Alternatively, the secondary mosaiced video stream 311 (I) is outputted via the front connector 20 (this configuration is not represented in the Figures for simplification purposes).

The secondary SFP unit 300 may have more than one front connector on the front panel 18 (this configuration is not represented in the Figures for simplification purposes). The reception of the primary mosaiced video streams 211 is spread across the plurality of front connectors. For example, the front connector 20 receives the primary mosaiced video streams A and B, and a second front connector not represented in FIG. 10C receives the primary mosaiced video streams C and D. Alternatively, the front connector 20 receives all the primary mosaiced video streams A, B, C and D as illustrated in FIG. 10C, and a second front connector not represented in FIG. 10C outputs the secondary mosaiced video stream 311 (I).

Referring more specifically to FIG. 7, an alternative implementation of the system consists of the following. The source video streams 201 are already scaled, and the primary SFP units 200 only implement the pre-positioning functionality directly applied to the received source scaled video streams 201.

In another alternative implementation of the system, the functionalities of the secondary SFP unit 300 are implemented by a generic computing device (such as a computer, a server, a networking equipment, etc.) instead of a SFP unit.

Figure 16:
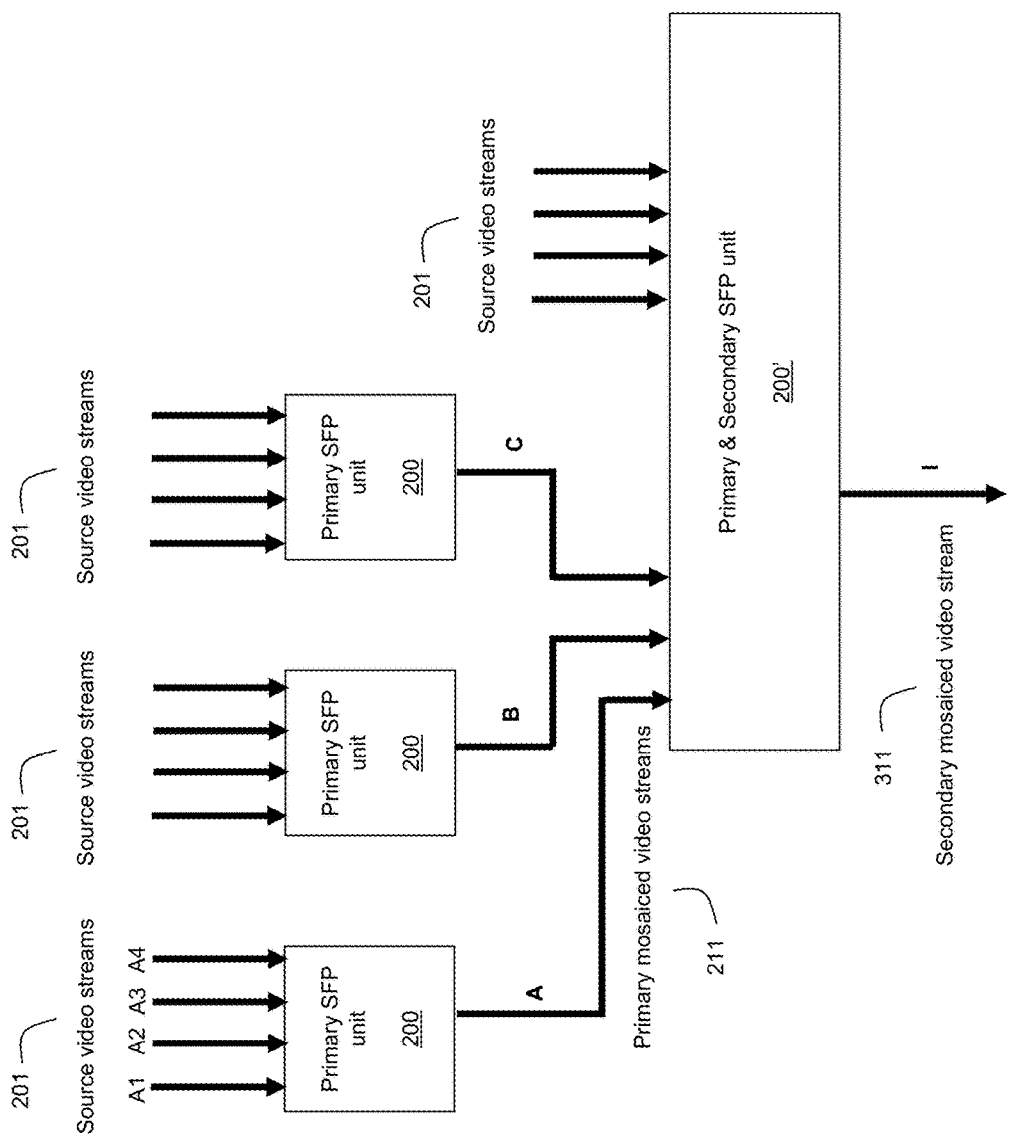
FIG. 16 represents an alternative to the first implementation represented in FIG. 7 of a system comprising cascaded standardized hot-pluggable transceiving units for providing scaling and positioning functionalities.

Referring more specifically to FIGS. 7 and 16, still another alternative implementation of the system consists of the following. One of the primary SFP units 200 represented in FIG. 7 also implements the functionalities of the secondary SFP unit 300 represented in FIG. 7.

FIG. 16 represents the SFP unit 200' combining the functionalities of a primary SFP unit (scaling functionality 252 and pre-positioning functionality 254 represented in FIG. 9A) and a secondary SFP unit (scaling functionality 352 and positioning functionality 354 represented in FIG. 10A). The SFP unit 200' receives source video streams 201, which are processed by the scaling functionality 252 and the pre-positioning functionality 254 represented in FIG. 9A to generate an internal primary mosaiced video stream (not represented in FIG. 16 for simplification purposes). The primary mosaiced video streams 211 (A, B and C) received from the primary SFP units 201 and the internal primary mosaiced video stream are processed by the scaling functionality 352 and the positioning functionality 354 represented in FIG. 10A to generate the secondary mosaiced video stream 311 (I).

Figure 11:
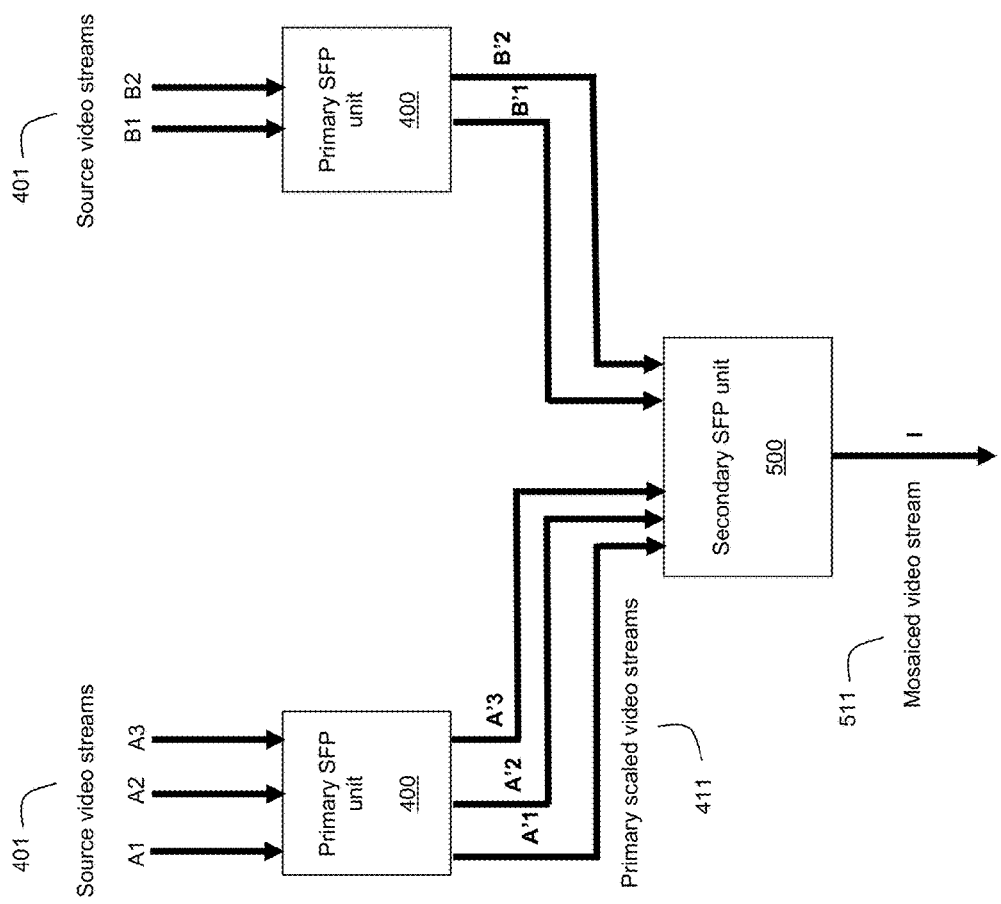
FIG. 11 represents a second implementation of a system comprising cascaded standardized hot-pluggable transceiving units for providing scaling and positioning functionalities.

Referring now to FIG. 11, a second implementation of a system comprising cascaded standardized hot-pluggable transceiving units for providing scaling and positioning functionalities is represented. As mentioned previously, for illustration purposes, the standardized hot-pluggable transceiving units consist of SFP units; but other types of standardized hot-pluggable transceiving units may be used for implementing the system.

The system comprises at least one primary SFP unit 400, and a secondary SFP unit 500. For illustration purposes, two primary SFP units 400 are represented in FIG. 11. However, the number of primary SFP units 400 used by the system may vary. The first layer comprising the at least one primary SFP unit 400 is cascaded into the second layer comprising the secondary SFP unit 500.

Each one of the primary SFP units 400 receives a plurality of source video streams 401, which are processed by the primary SFP unit 400 to generate and output a corresponding plurality of primary scaled video streams 411. For illustration purposes, three source video streams 401 are received by the first primary SFP unit 400 represented in FIG. 11, and two source video streams 401 are received by the second primary SFP unit 400 represented in FIG. 11. However, the number of source video streams 401 received by each primary SFP unit 400 may vary, and may differ from one primary SFP unit 400 to another. As will be illustrated later in the description, each primary SFP unit 400 implements a scaling functionality for generating the outputted primary scaled video streams 411 based on the received source video streams 401.

The secondary SFP unit 500 receives the plurality of primary scaled video stream 411 generated and outputted by the at least one primary SFP unit 400. The secondary SFP unit 500 processes the plurality of primary scaled video streams 411 to generate and output a mosaiced video stream 511. As will be illustrated later in the description, the secondary SFP unit 500 implements a scaling functionality and a positioning functionality for generating the outputted mosaiced video stream 511 based on the received primary scaled video streams 411.

Figure 12A:
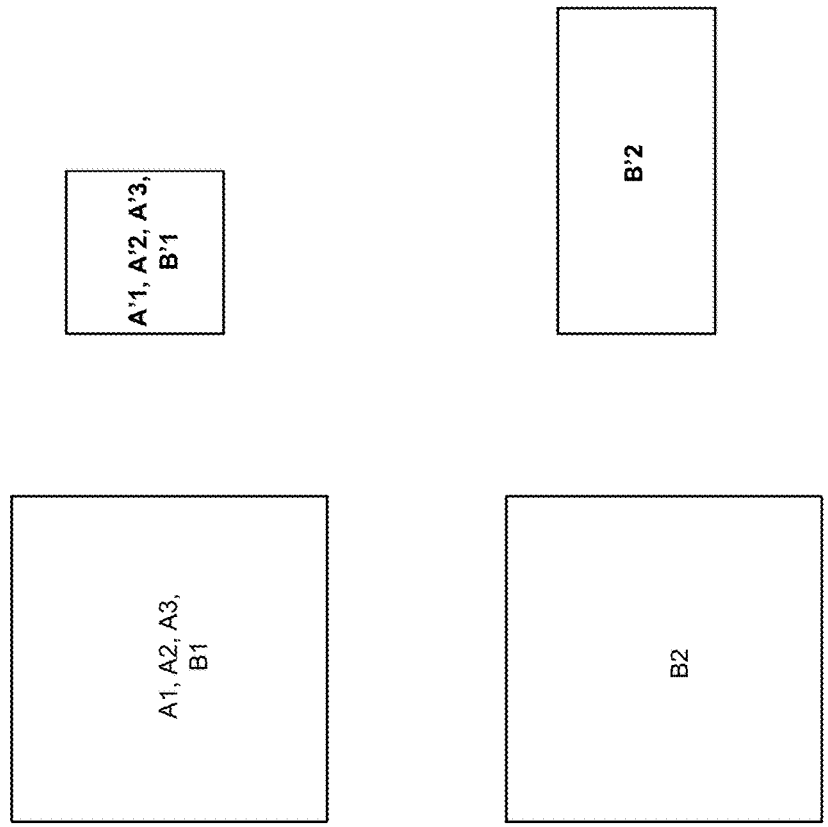
FIG. 12A illustrates a scaling functionality implemented by a first layer of the system of FIG. 11.
Figure 12B:
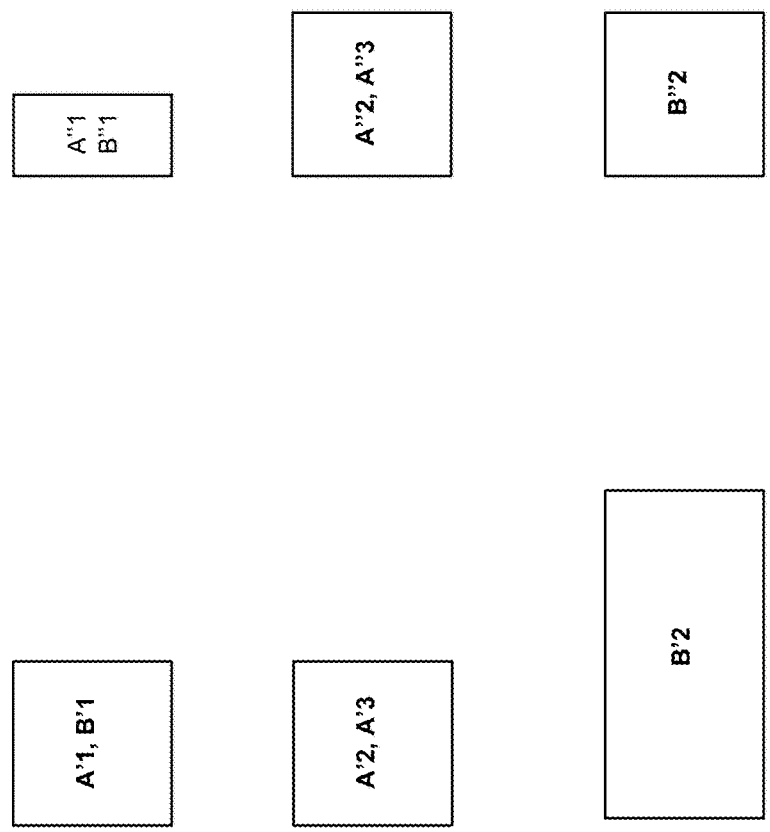
FIG. 12B illustrates a scaling functionality implemented by a second layer of the system of FIG. 11.
Figure 12C:
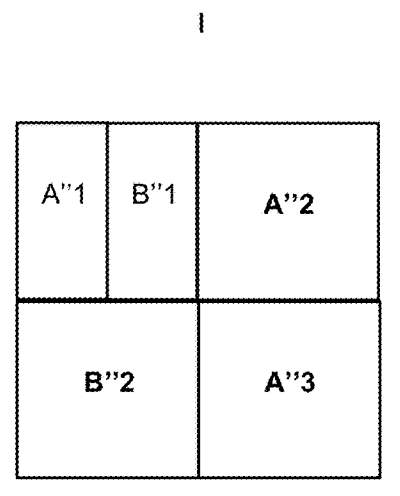

Reference is now made concurrently to FIGS. 11, 12A, 12B and 12C; where FIG. 12A illustrates the scaling functionality implemented by the primary SFP unit(s) 400, FIG. 12B illustrates the scaling functionality implemented by the secondary SFP unit 500, and FIG. 12C illustrates the positioning functionality implemented by the secondary SFP unit 500.

Referring more particularly to FIGS. 11 and 12A, the source video streams 401 received by the primary SFP units 400 located on FIG. 11 are respectively labelled A1, A2, A3 (primary SFP unit 400 on the left of FIG. 11) and B1, B2 (primary SFP unit 400 on the right of FIG. 11). The scaling functionality implemented by the primary SFP units 400 scales the source video streams A1, A2, A3 and B1, B2 into corresponding primary scaled video streams 411 respectively labelled A'1, A'2, A'3 and B'1, B'2. FIG. 12A illustrates a horizontal scaling factor of ½ and a vertical scaling factor of ½ applied to the source video streams A1, A2, A3 and B1 to generate the primary scaled video streams A'1, A'2, A'3 and B'1. FIG. 12A also illustrates a horizontal scaling factor of 1 and a vertical scaling factor of ½ applied to the source video stream B2 to generate the primary scaled video stream B'2. FIG. 12A is for illustration purposes only. Different values of scaling factors may be applied to each one of the source video streams (e.g. A1, A2, A3 and B1, B2) received by each one of the primary SFP units 400, and the values of the scaling factors may differ from one source video stream to another.

The scaling functionality implemented by the primary SFP units 400 is functionally equivalent to the previously described scaling functionality implemented by the primary SFP units 200 of FIG. 7.

Referring more particularly to FIGS. 11 and 12B, the scaling functionality implemented by the secondary SFP unit 500 scales the plurality of primary scaled video streams 411 (A'1, A'2, A'3, B'1, B'2) outputted by the primary SFP unit(s) 400 into corresponding secondary scaled video streams respectively labelled A"1, A"2, A"3, B"1, B"2. FIG. 12B illustrates a horizontal scaling factor of ½ and a vertical scaling factor of 1 applied to the primary scaled video streams A'1 and B'1 to generate the secondary scaled video streams A"1 and B"1. FIG. 12B also illustrates a horizontal scaling factor of 1 and a vertical scaling factor of 1 applied to the primary scaled video streams A'2 and A'3 to generate the secondary scaled video streams A"2 and A"3. FIG. 12B further illustrates a horizontal scaling factor of ½ and a vertical scaling factor of 1 applied to the primary scaled video stream B'2 to generate the secondary scaled video stream B"2. FIG. 12B is for illustration purposes only. Different values of scaling factors may be applied to each one of the primary scaled video streams A'1, A'2, A'3, B'1, B'2 received from the primary SFP units 400, and the values of the scaling factors may differ from one primary scaled video stream to another.

The scaling functionality implemented by the secondary SFP unit 500 is functionally equivalent to the previously described scaling functionality implemented by the secondary SFP unit 300 of FIG. 7.

Referring more particularly to FIGS. 11 and 12C, the positioning functionality of the secondary SFP unit 500 processes the plurality of secondary scaled video streams A"1, A"2, A"3, B"1, B"2 generated by the scaling functionality of the secondary SFP unit 500, to generate the mosaiced video stream 511 labelled I. FIG. 12C illustrates the positioning of the secondary scaled video streams A"1, A"2, A"3, B"1, B"2 generated by the scaling functionality of by the secondary SFP unit 500 of FIG. 11 to generate the corresponding mosaiced video stream I.

The positioning functionality implemented by the secondary SFP unit 500 is functionally equivalent to the previously described positioning functionality implemented by the secondary SFP unit 300 of FIG. 7.

For instance, FIG. 12C illustrates the mosaiced frames I generated by combining the secondary scaled video frames A"1, A"2, A"3, B"1, B"2; these secondary scaled video frames being respectively positioned at the upper left, upper right, lower right, upper middle and lower left positions within mosaiced frames I.

Figure 13A:
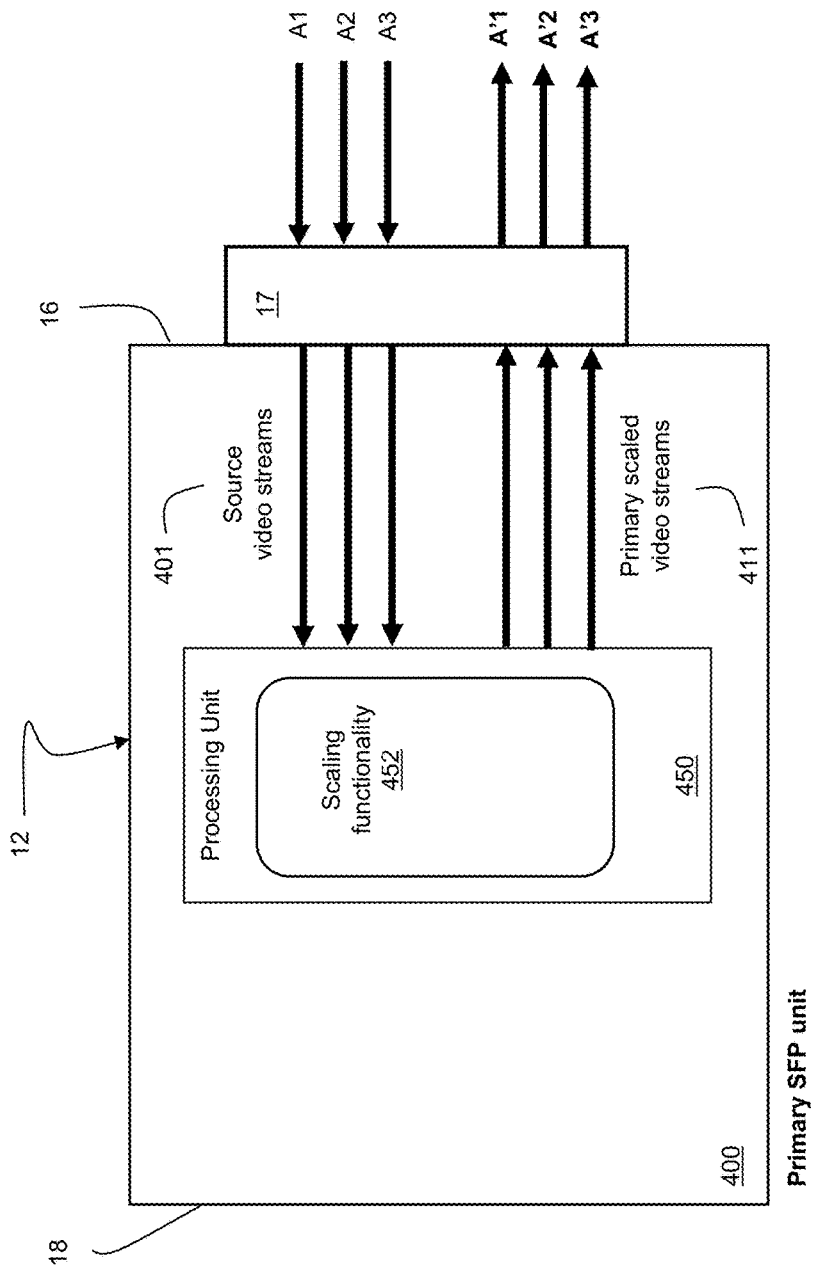
FIGS. 13A and 13B illustrate a primary SFP unit of the system of FIG. 11.

Reference is now made concurrently to FIGS. 11, 12A and 13A; where FIG. 13A illustrates a first configuration of the primary SFP unit 400. For illustration purposes, the primary SFP unit 400 of FIG. 13A corresponds to the primary SFP unit 400 on the left of FIG. 11. Furthermore, the primary SFP unit 400 of FIG. 13A corresponds to the SFP unit 10 represented in FIGS. 1 to 6, and comprises the housing 12, the back panel 16 and the front panel 18.

The primary SFP unit 400 has a rear connector 17 on the back panel 16, and receives the source video streams 401 (A1, A2, A3) via the rear connector 17.

The primary SFP unit 400 comprises at least one processing unit 450 (only one processing unit 450 is represented on FIG. 13A for simplification purposes). The at least one processing unit 450 executes the aforementioned scaling functionality 452. The scaling functionality 452 processes the received source video streams 401 (A1, A2, A3) for respectively scaling the source video streams 401 (A1, A2, A3) into the primary scaled video streams 411 (A'1, A'2, A'3). The primary scaled video streams 411 (A'1, A'2, A'3) are outputted via the rear connector 17.

The primary SFP unit 400 does not have any front connector on the front panel 18, since all the data are exchanged via the rear connector 17. Alternatively, the primary SFP unit 400 may have one or more front connectors on the front panel 18, for exchanging additional data and performing a processing of these additional data which is out of the scope of the present disclosure.

Figure 13B:
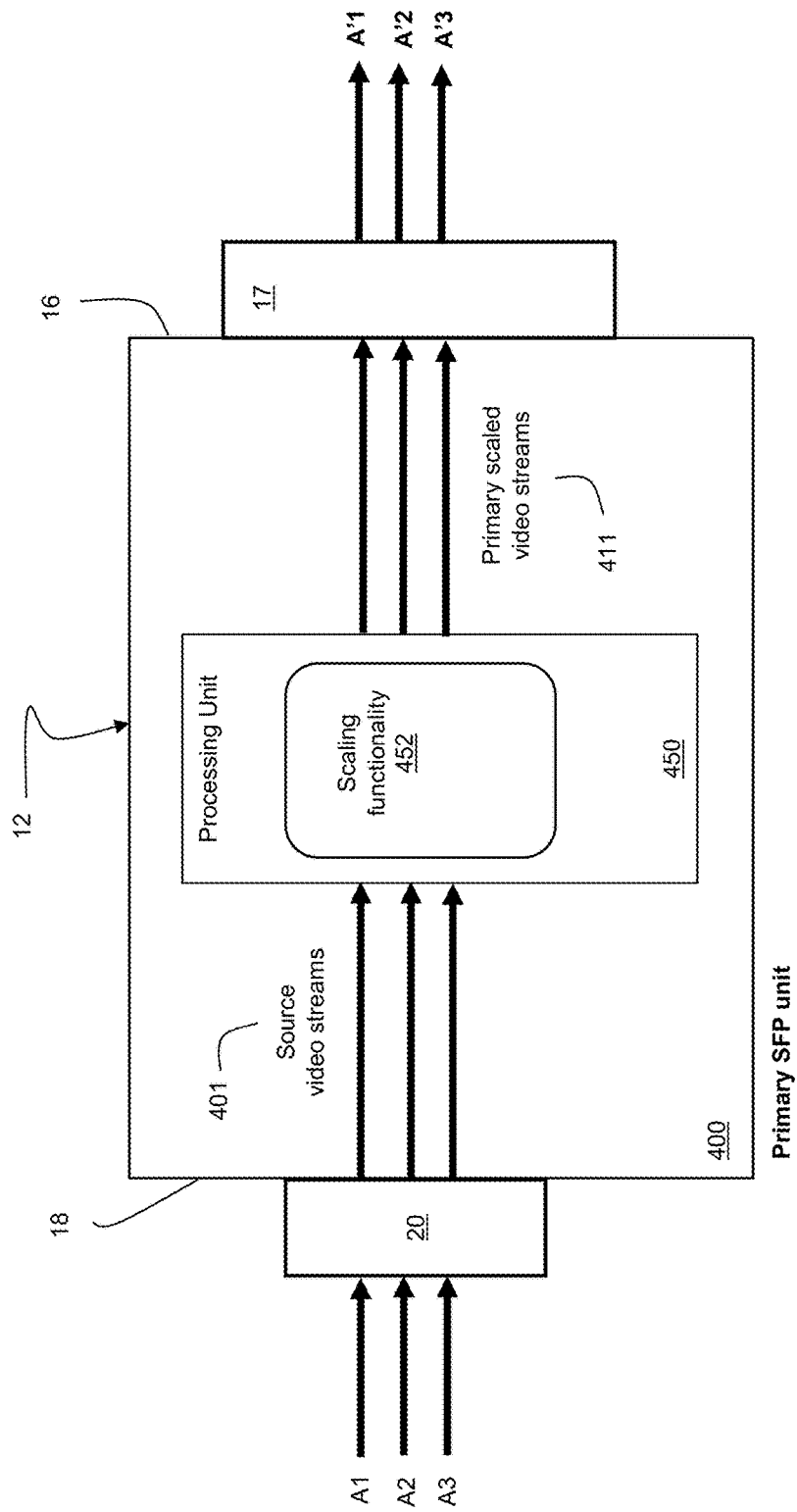

Reference is now made concurrently to FIGS. 11, 12A and 13B; where FIG. 13B illustrates a second configuration of the primary SFP unit 400. For illustration purposes, the primary SFP unit 400 of FIG. 13B also corresponds to the primary SFP unit 400 on the left of FIG. 11. Furthermore, the primary SFP unit 400 of FIG. 13B corresponds to the SFP unit 10 represented in FIGS. 1 to 6, and comprises the housing 12, the back panel 16 and the front panel 18.

The primary SFP unit 400 has a rear connector 17 on the back panel 16 and a front connector 20 on the front panel 18. The primary SFP unit 400 receives the source video streams 401 (A1, A2, A3) via the front connector 20.

The primary SFP unit 400 comprises at least one processing unit 450 (only one processing unit 450 is represented on FIG. 13B for simplification purposes). The at least one processing unit 450 executes the aforementioned scaling functionality 452. The scaling functionality 452 processes the received source video streams 401 (A1, A2, A3) for respectively scaling the source video streams 401 (A1, A2, A3) into the primary scaled video streams 411 (A'1, A'2, A'3). The primary scaled video streams 411 (A'1, A'2, A'3) are outputted via the rear connector 17. Alternatively, the primary scaled video streams 411 (A'1, A'2, A'3) are outputted via the front connector 20 (this configuration is not represented in the Figures for simplification purposes).

The primary SFP unit 400 may have more than one front connector on the front panel 18 (this configuration is not represented in the Figures for simplification purposes). The reception of the source video streams 401 is spread across the plurality of front connectors. For example, the front connector 20 receives the source video streams A1 and A2, and a second front connector not represented in FIG. 13B receives the source video stream A3. Alternatively, the front connector 20 receives all the source video streams A1, A2, A3 as illustrated in FIG. 13B, and a second front connector not represented in FIG. 13B outputs the primary scaled video streams A'1, A'2, A'3.

In a particular embodiment, the primary SFP unit 400 has four front connectors (Quad SFP) of electrical or optical type with an aggregate bandwidth of at least 40 Gbps.

Figure 14A:
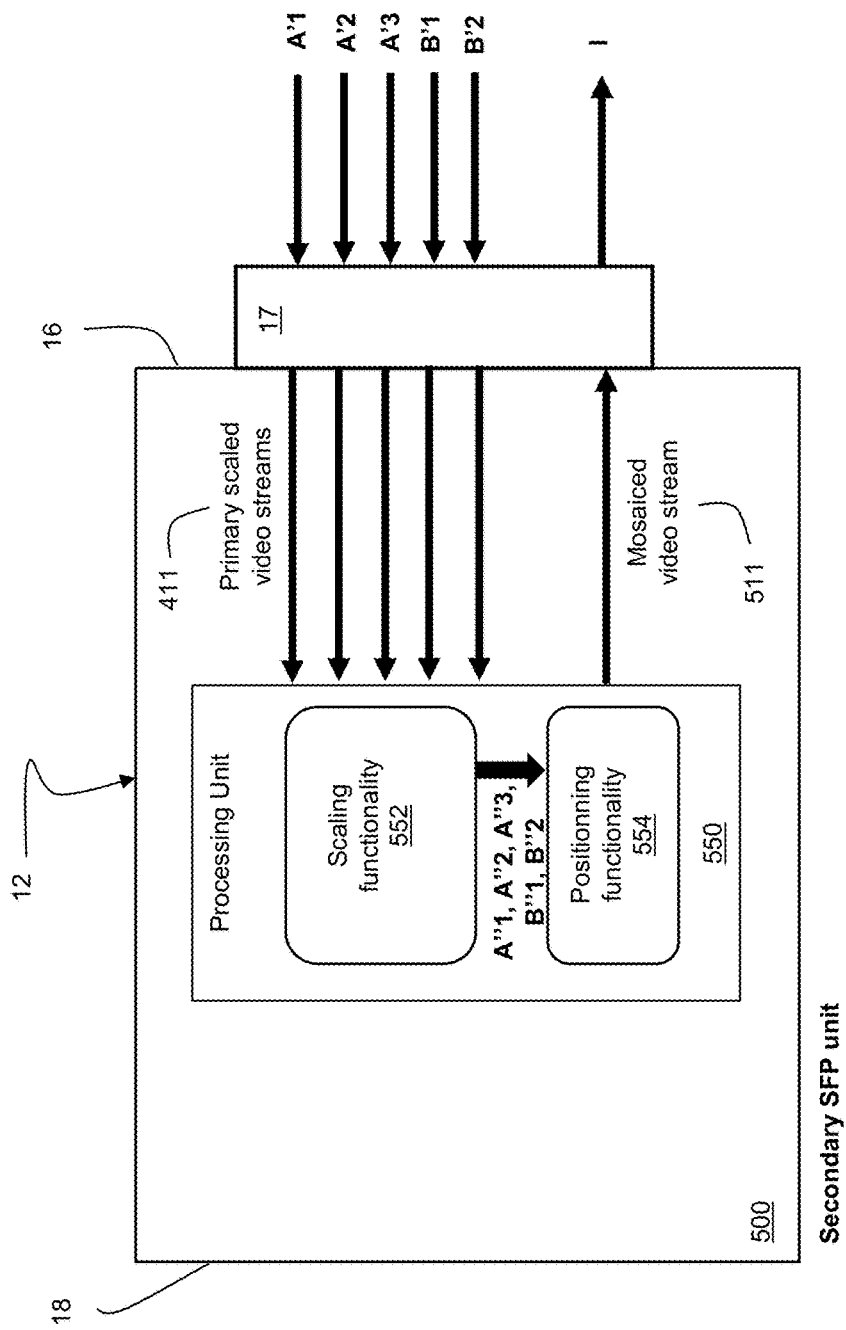
FIGS. 14A, 14B and 14C illustrate a secondary SFP unit of the system of FIG. 11.

Reference is now made concurrently to FIGS. 11, 12B, 12C and 14A; where FIG. 14A illustrates a first configuration of the secondary SFP unit 500. The secondary SFP unit 500 corresponds to the SFP unit 10 represented in FIGS. 1 to 6, and comprises the housing 12, the back panel 16 and the front panel 18.

The secondary SFP unit 500 has a rear connector 17 on the back panel 16, and receives the primary scaled video streams 411 (A'1, A'2, A'3 and B'1, B'2 respectively generated by the two primary SFP units 400 of FIG. 11) via the rear connector 17.

The secondary SFP unit 500 comprises at least one processing unit 550 (only one processing unit 550 is represented on FIG. 14A for simplification purposes). The at least one processing unit 550 executes the aforementioned scaling functionality 552 and positioning functionality 554.

The scaling functionality 552 processes the received primary scaled video streams 411 (A'1, A'2, A'3 and B'1, B'2) for respectively scaling the primary scaled video streams A'1, A'2, A'3, B'1, B'2 into the secondary scaled video streams A"1, A"2, A"3, B"1, B"2.

The positioning functionality 554 processes the secondary scaled video streams A"1, A"2, A"3, B"1, B"2 for mosaicing the secondary scaled video streams A"1, A"2, A"3, B"1, B"2 into the mosaiced video stream 511 (I). The mosaiced video stream 511 (I) is outputted via the rear connector 17.

The secondary SFP unit 500 does not have any front connector on the front panel 18, since all the data are exchanged via the rear connector 17. Alternatively, the secondary SFP unit 500 may have one or more front connectors on the front panel 18, for exchanging additional data and performing a processing of these additional data which is out of the scope of the present disclosure.

Figure 14B:
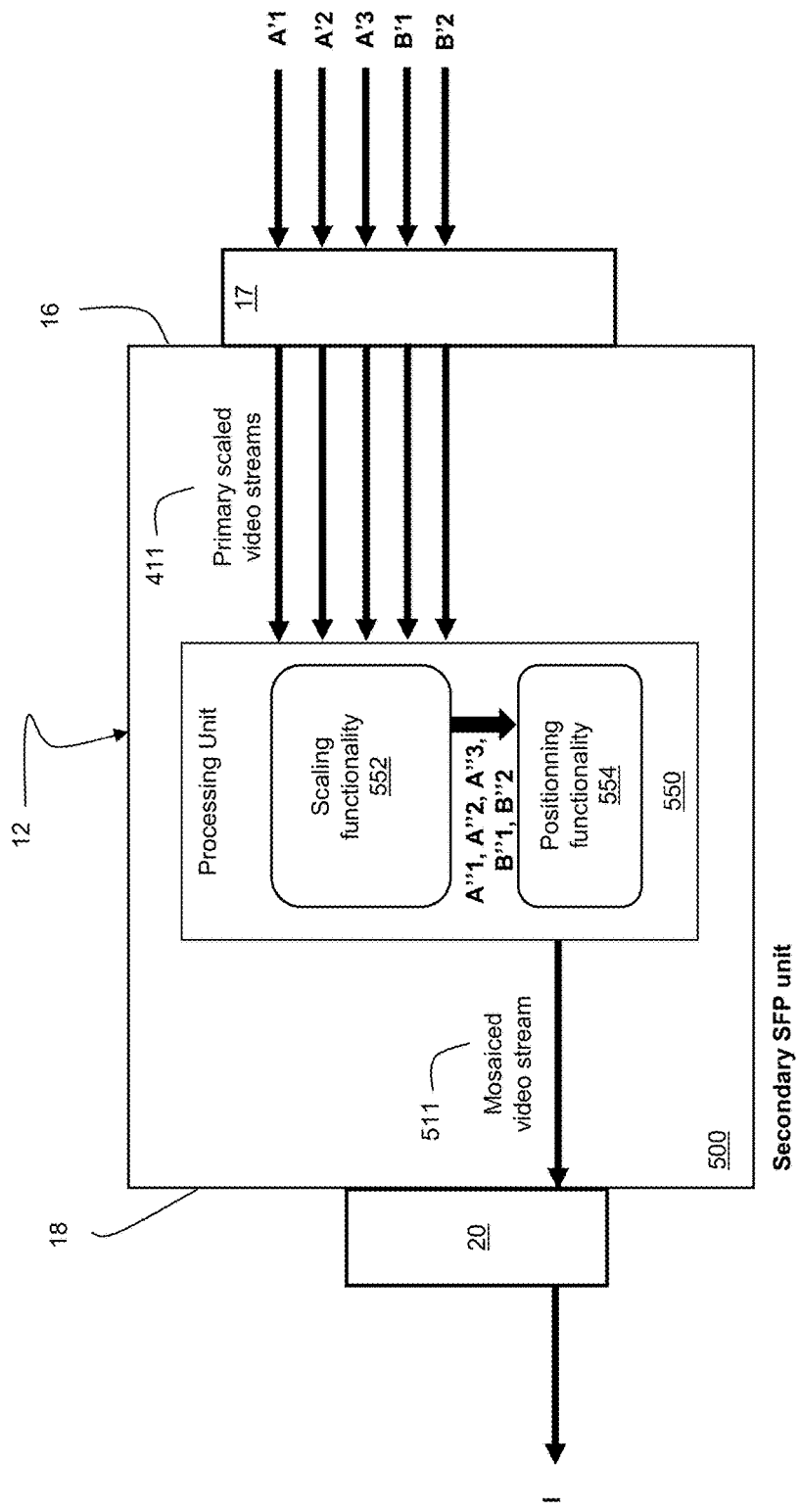

Reference is now made concurrently to FIGS. 11, 12B, 12C and 14B; where FIG. 14B illustrates a second configuration of the secondary SFP unit 500. The secondary SFP unit 500 corresponds to the SFP unit 10 represented in FIGS. 1 to 6, and comprises the housing 12, the back panel 16 and the front panel 18.

The secondary SFP unit 500 has a rear connector 17 on the back panel 16, and a front connector 20 on the front panel 18. The secondary SFP unit 500 receives the primary scaled video streams 411 (A'1, A'2, A'3 and B'1, B'2 respectively generated by the two primary SFP units 400 of FIG. 11) via the rear connector 17.

The secondary SFP unit 500 comprises at least one processing unit 550 (only one processing unit 550 is represented on FIG. 14A for simplification purposes). The at least one processing unit 550 executes the aforementioned scaling functionality 552 and positioning functionality 554.

The scaling functionality 552 processes the received primary scaled video streams 411 (A'1, A'2, A'3 and B'1, B'2) for respectively scaling the primary scaled video streams A'1, A'2, A'3, B'1, B'2 into the secondary scaled video streams A"1, A"2, A"3, B"1, B"2.

The positioning functionality 554 processes the secondary scaled video streams A"1, A"2, A"3, B"1, B"2 for mosaicing the secondary scaled video streams A"1, A"2, A"3, B"1, B"2 into the mosaiced video stream 511 (I). The mosaiced video stream 511 (I) is outputted via the front connector 20.

The secondary SFP unit 500 may have more than one front connector on the front panel 18, for exchanging additional data and performing a processing of these additional data which is out of the scope of the present disclosure.

Figure 14C:
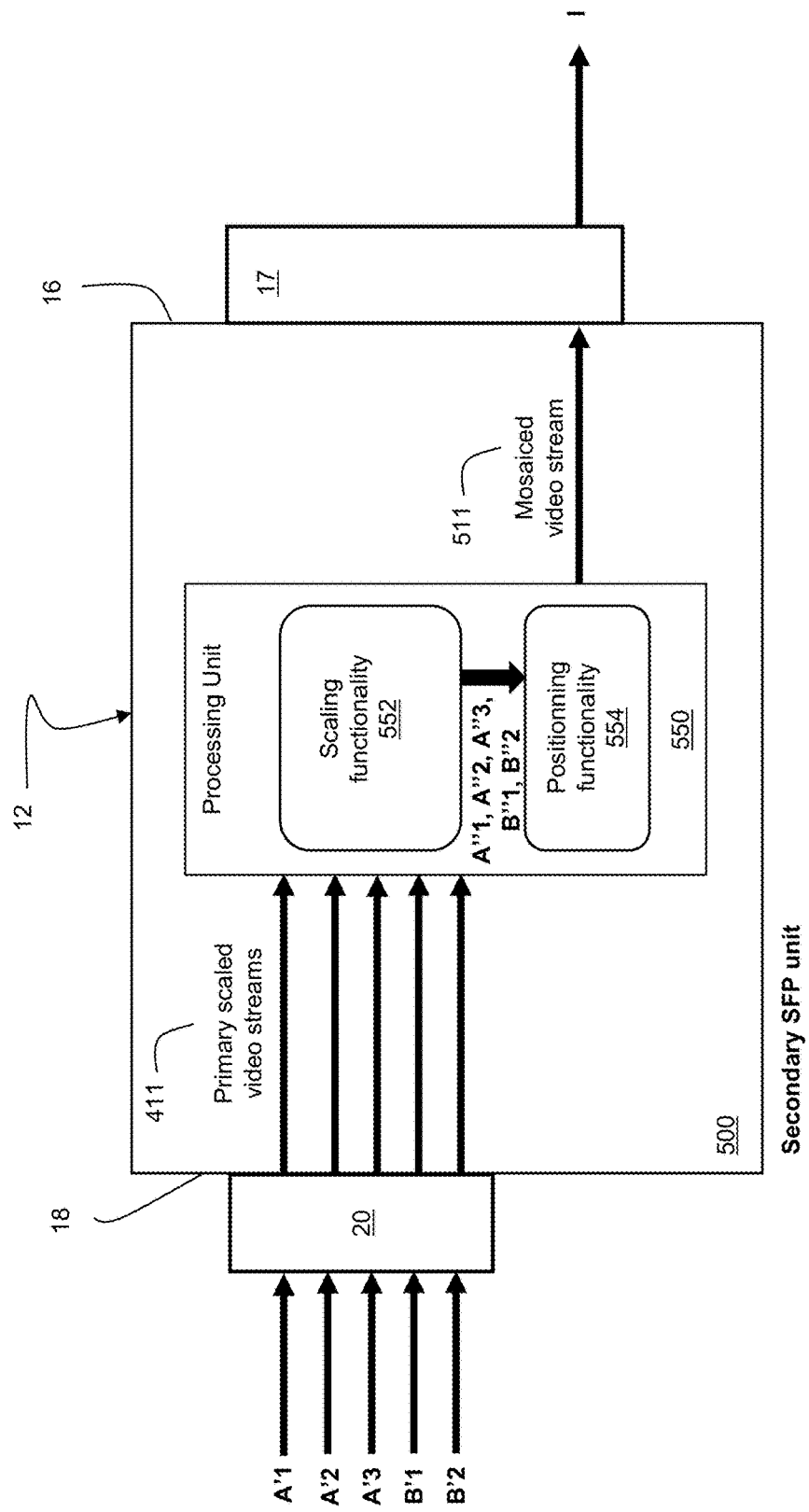

Reference is now made concurrently to FIGS. 11, 12B, 12C and 14C; where FIG. 14C illustrates a third configuration of the secondary SFP unit 500. The secondary SFP unit 500 corresponds to the SFP unit 10 represented in FIGS. 1 to 6, and comprises the housing 12, the back panel 16 and the front panel 18.

The secondary SFP unit 500 has a rear connector 17 on the back panel 16 and a front connector 20 on the front panel 18. The secondary SFP unit 500 receives the primary scaled video streams 411 (A'1, A'2, A'3 and B'1, B'2 respectively generated by the two primary SFP units 400 of FIG. 11) via the front connector 20.

The secondary SFP unit 500 comprises at least one processing unit 550 (only one processing unit 550 is represented on FIG. 14C for simplification purposes). The at least one processing unit 550 executes the aforementioned scaling functionality 552 and positioning functionality 554.

The scaling functionality 552 processes the received primary scaled video streams 411 (A'1, A'2, A'3 and B'1, B'2) for respectively scaling the primary scaled video streams A'1, A'2, A'3, B'1, B'2 into the secondary scaled video streams A"1, A"2, A"3, B"1, B"2.

The positioning functionality 554 processes the secondary scaled video streams A"1, A"2, A"3, B"1, B"2 for mosaicing the secondary scaled video streams A"1, A"2, A"3, B"1, B"2 into the mosaiced video stream 511 (I). The mosaiced video stream 511 (I) is outputted via the rear connector 17. Alternatively, the mosaiced video stream 511 (I) is outputted via the front connector 20 (this configuration is not represented in the Figures for simplification purposes).

The secondary SFP unit 500 may have more than one front connector on the front panel 18 (this configuration is not represented in the Figures for simplification purposes). The reception of the primary scaled video streams 411 is spread across the plurality of front connectors. For example, the front connector 20 receives the primary scaled video streams A'1, A'2, A'3, and a second front connector not represented in FIG. 14C receives the primary scaled video streams B'1, B'2. Alternatively, the front connector 20 receives all the primary scaled video streams A'1, A'2, A'3 and B'1, B'2 as illustrated in FIG. 14C, and a second front connector not represented in FIG. 14C outputs the mosaiced video stream 511 (I).

Referring more specifically to FIG. 11, in an alternative implementation of the system, the functionalities of the secondary SFP unit 500 are implemented by a generic computing device (such as a computer, a server, a networking equipment, etc.) instead of a SFP unit.

Figure 17:
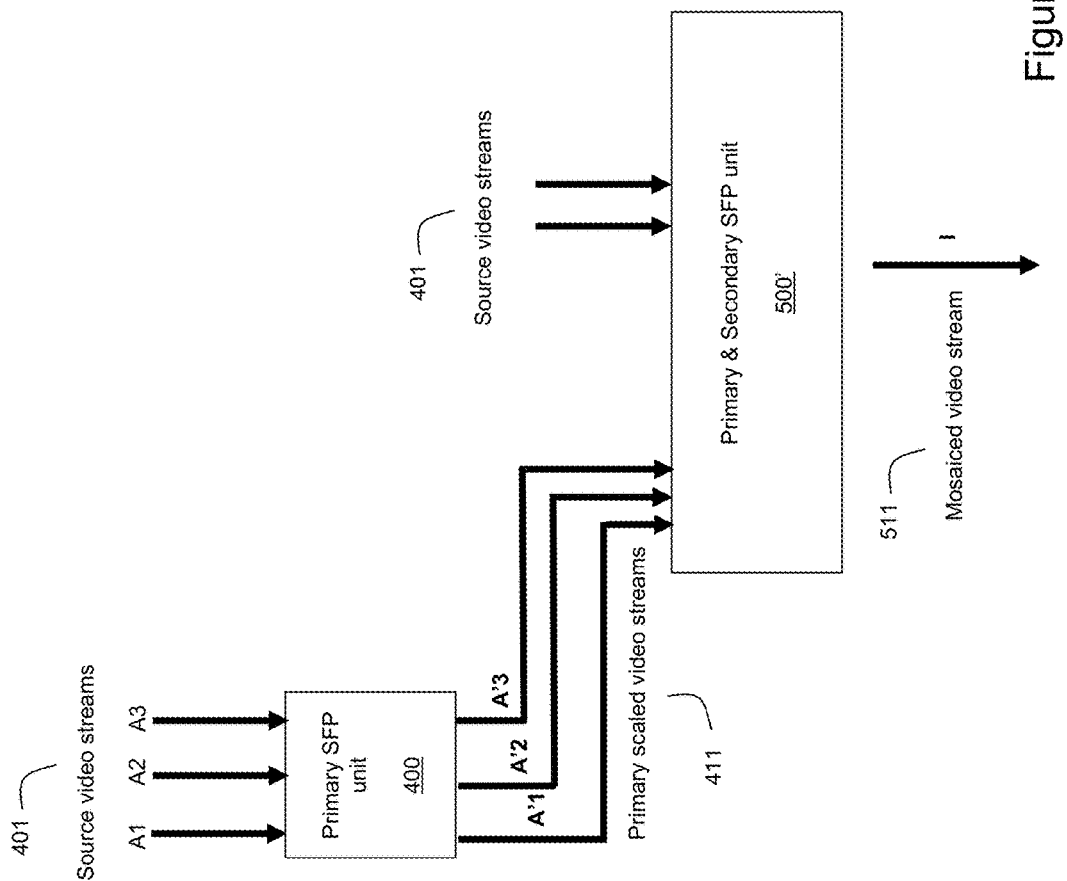
FIG. 17 represents an alternative to the second implementation represented in FIG. 11 of a system comprising cascaded standardized hot-pluggable transceiving units for providing scaling and positioning functionalities.

Referring more specifically to FIGS. 11 and 17, another alternative implementation of the system consists of the following. One of the primary SFP units 400 represented in FIG. 11 also implements the functionalities of the secondary SFP unit 500 represented in FIG. 11. The implementation represented in FIG. 17 is similar to the implementation represented in FIG. 16, with the exception that the primary SFP units of FIG. 16 implement a pre-positioning functionality, while the primary SFP units of FIG. 17 do not implement a pre-positioning functionality.

FIG. 17 represents the SFP unit 500' combining the functionalities of a primary SFP unit (scaling functionality 452 represented in FIG. 13A) and a secondary SFP unit (scaling functionality 552 and positioning functionality 554 represented in FIG. 14A). The SFP unit 500' receives source video streams 401, which are processed by the scaling functionality 452 represented in FIG. 13A to generate internal primary scaled video streams (not represented in FIG. 17 for simplification purposes). The primary scaled video streams 411 (e.g. A'1, A'2 and A'3) received from the primary SFP unit(s) 401 and the internal primary scaled video streams are processed by scaling functionality 552 and the positioning functionality 554 represented in FIG. 14A to generate the mosaiced video stream 511 (I).

Reference is now made concurrently to FIGS. 9A-B, 10A-C, 13A-B and 14A-C.

The scaling functionality (252, 352 452 or 552), the pre-positioning functionality 254, and the positioning functionality (354 or 554) are implemented by a software executed by the corresponding processing units (250, 350, 450 or 550). Alternatively, the scaling functionality (252, 352, 452 or 552), the pre-positioning functionality 254, and the positioning functionality (354 or 554) are implemented by dedicated hardware component(s) of the corresponding processing units (250, 350, 450 or 550), for instance one or several Field-Programmable Gate Array (FPGA). A combination of software and dedicated hardware component(s) may also be used for implementing these functionalities.

The processing unit 250 (or 450) of the primary SFP unit 200 (or 400) may execute additional functionalities, prior to or after executing the scaling functionality 252 (or 452). Some of the additional functionalities may be executed by another processing unit (not represented in the Figures) of the primary SFP unit 200 (or 400), instead of being also executed by the processing unit 250 (or 450).

For example, the processing unit 250 (or 450) also executes a de-interlacing functionality (not represented in the Figures for simplification purposes). At least one of the source video streams 201 (or 401) received by the primary SFP unit 200 (or 400) is interlaced, and the corresponding scaled video stream generated by the primary SFP unit 200 (or 400) is de-interlaced. More specifically, each video frame transported by one of the source video streams 201 (or 401) is interlaced, and each corresponding scaled video frame of the corresponding scaled video stream is de-interlaced. The operation consisting in de-interlacing a video frame is well known in the art. The received source video stream 201 (or 401) is first de-interlaced by the de-interlacing functionality, and then scaled by the scaling functionality 252 (or 452), to generate a de-interlaced scaled video stream. Alternatively, the received source video stream 201 (or 401) is first scaled by the scaling functionality 252 (or 452), and then de-interlaced by the de-interlacing functionality, to generate the de-interlaced scaled video stream.

In another example, at least one of the source video streams 201 (or 401) received by the primary SFP unit 200 (or 400) is in a High Definition (HD) format with a higher resolution (e.g. 1080p), and the corresponding scaled video stream is in a HD format with a lower resolution (e.g. 720p or 1080i). The processing unit 250 (or 450) further performs a conversion of the higher resolution HD format of the source video stream into the lower resolution HD format of the corresponding scaled video stream. The conversion from the higher resolution HD format to the lower resolution HD format can be performed before or after executing the scaling functionality 252 (or 452).

The processing unit 350 (or 550) of the secondary SFP unit 300 (or 500) may also execute additional functionalities, prior to or after executing the positioning functionality 354 (or 554). Some of the additional functionalities may be executed by another processing unit (not represented in the Figures) of the secondary SFP unit 300 (or 500), instead of being also executed by the processing unit 350 (or 550).

For example, the processing unit 350 (or 550) also executes a post-production functionality (not represented in the Figures for simplification purposes). The post-production functionality consists in adding post-production data to the secondary mosaiced video stream 311 of FIGS. 10A-C (or the mosaiced video stream 511 of FIGS. 14A-C) before it is outputted. The post-production data include at least one of the following: a sur-imposed text, a sur-imposed icon, a sur-imposed image, etc. The post-production data convey information relative to error detection (e.g. frame blank, frame freeze, etc.), origin of the source video streams 201 (or 401), etc.

The rear connector 17 of the SFP units 200 (or 400) and 300 (or 500) is an electrical connector adapted for receiving and outputting electrical signals transporting the video streams.

The front connector(s) (e.g. 20) of the SFP units 200 (or 400) and 300 (or 500) is an electrical connector adapted for receiving and/or outputting electrical signals transporting the video streams over an electric cable connected to the front connector. Alternatively, the front connector(s) (e.g. 20) of the SFP units 200 (or 400) and 300 (or 500) is an optical connector adapted for receiving and/or outputting optical signals transporting the video streams over an optical cable connected to the front connector.

The video streams are transported by IP flows, which have a physical layer adapted for the transport of IP packets, such as Ethernet, Synchronous Optical Networking (SONET)/Synchronous Digital Hierarchy (SDH), etc. An IP flow is well known in the art. It consists in a sequence of IP packets from a source to a destination, delivered via zero, one or more intermediate routing (e.g. a router) or switching equipment (e.g. an IP switch). Several protocol layers are involved in the transport of the IP packets of the IP flow, including a physical layer (e.g. optical or electrical), a link layer (e.g. Media Access Control (MAC) for Ethernet), an Internet layer (e.g. IPv4 or IPv6), a transport layer (e.g. User Datagram Protocol (UDP)), and one or more application layers ultimately embedding a video payload (the video frames transported by a video stream). Optionally, the application layers also ultimately embed an audio payload and/or a metadata payload. The IP flow provides end-to-end delivery of the video payload over an IP networking infrastructure. The IP flow may be unicast or multicast.

The video payload transported by the IP flows may consist of an SDI payload, which is compliant with the SDI standard. It encompasses several variants of the SDI standard, including for example SD-SDI, HD-SDI, ED-SDI, 3G-SDI, 6G-SDI, 12G-SDI, etc.; which have all been standardized by the Society of Motion Picture & Television Engineers (SMPTE) organization. An SDI payload comprises a video payload carrying a video component of a source SDI signal. The SDI payload generally also comprises at least one additional payload, such as an audio payload for carrying an audio component of the source SDI signal and/or a metadata payload for carrying a metadata component of the source SDI signal.

Furthermore, the SDI video payload may be compliant with at least one of the following SMPTE standards: the SMPTE 2022-5 standard, the SMPTE 2022-6 standard, and the SMPTE 2022-7 standard. These three standards are used singly or in combination for transporting SDI payloads (e.g. a SDI video payload and a corresponding SDI audio payload) over IP. The SMPTE 2022-5 standard provides a Forward Error Correction (FEC) scheme for compensating potential IP packet losses of an IP flow transporting an SDI payload, since IP networks do not provide a guaranteed delivery of all transmitted IP packets. The SMPTE 2022-6 standard provides transport of SDI payloads via the Real-time Transport Protocol (RTP). It also provides an additional protocol layer on top of the RTP layer: the High-Bitrate Media Transport Protocol (HBRMT) protocol layer, which supports a high-precision clock and extra metadata. The SMPTE 2022-7 standard provides seamless protection switching to an IP flow transporting an SDI payload, by sending two matching streams of IP packets from a source to a destination over different paths, and have the receiver switch automatically between them. Alternatively or complementarily, the SDI video payload may also be compliant with one of the SMPTE 2110 standards, such as SMPTE 2110-10, SMPTE 2110-20, SMPTE 2110-21, SMPTE 2110-30, SMPTE 2110-40, SMPTE 2110-50, etc. For example, in some cases, the SDI video payload conforms to a combination of one of the SMPTE 2022 standard family and one of the SMPTE 2110 standard family.

Other types of video payloads can be transported by the IP flows, such as for example a High-Definition Multimedia Interface (HDMI) video payload, etc.

In some cases, some of the front connectors (e.g. 20) of the SFP units 200 (or 400) and 300 (or 500) are not adapted to receive and/or output video streams transported by an IP flow. These front connectors (e.g. 20) are adapted to receive and/or output a native video signal transporting the video streams. For example, the native video signal is generated by a source video equipment and transported as is from the source video equipment to the SFP unit, without conversion into an IP flow. In another example, the native video signal is used by a destination video equipment and transported as is from the SFP unit to the destination video equipment, without conversion into an IP flow. For instance, some of the front connectors (e.g. 20) consist of SDI connectors adapted to receive and/or output SDI video signals. SDI connectors are a family of digital video interfaces using one or more coaxial cables with Bayonet Neill-Concelman (BNC) connectors, High-Definition BNC (HD-BNC) connectors, Deutsches Institut für Normung (DIN) 1.0/2.3 connectors, etc.

The operations of at least one of the scaling functionality 252 (or 352, 452, 552), the pre-positioning functionality 254 and the positioning functionality 354 (or 554) can be remotely controlled.

With respect to the scaling functionalities 252 or 452, the primary SFP unit (e.g. 200 or 400) receives a control message from a third-party computing device (not represented in the Figures). The control message comprises at least one scaling ratio and an identification of a corresponding source video stream (e.g. A1).

With respect to the scaling functionalities 352 or 552, the secondary SFP unit (e.g. 300 or 500) receives a control message from a third-party computing device (not represented in the Figures). The control message comprises at least one scaling ratio and an identification of a corresponding primary mosaiced video stream (e.g. A)/corresponding primary scaled video stream (e.g. A'1).

For example, a control message comprises an identification of a source IP flow (e.g. source and destination IP addresses, source and destination ports) transporting one of the source video streams (e.g. A1) and a scaling ratio to apply to this source video stream (e.g. A1). Upon reception of this command, the scaling functionality (e.g. 252) starts generating the corresponding scaled video stream (e.g. A'1) in accordance with the scaling factor provided in the control message.

At the beginning of the operations of the primary SFP unit (e.g. 200), the control message comprises an identification of all the source video streams (e.g. A1, A2, A3, A4) and corresponding scaling ratios to respectively apply to these source video streams, to generate the corresponding scaled video streams (e.g. A'1, A'2, A'3, A'4). Later on, an update control message may be received, to modify one or more scaling ratios applied to one or more of the source video streams (e.g. only A1 and A3). If several source video streams have the same scaling ratio (e.g. A1, A2, A2. A4 in FIG. 8A), the control message comprises this particular scaling ratio associated to all the source video streams having this particular scaling ratio.

With respect to the pre-positioning functionality (e.g. 254), the primary SFP unit (e.g. 200) receives a control message from a third-party computing device (not represented in the Figures). The control message comprises an identification of each of the scaled video streams (e.g. A'1, A'2, A'3, A'4), and their respective position within the primary mosaiced video stream (e.g. A). The identification of the scaled video streams (e.g. A'1, A'2, A'3, A'4) simply consists in the identification of the corresponding source video streams (e.g. A1, A2, A3, A4), the processing unit 250 storing an association between the source video streams (e.g. A1, A2, A3, A4) and the scaled video streams (e.g. A'1, A'2, A'3, A'4). The same control message may be used for controlling the scaling functionality (e.g. 252) and the pre-positioning functionality (e.g. 254). During operations, an update control message may be received, to modify one or more positions applied to one or more of the scaled video streams (e.g. only A'1 and A'3). The update control message may affect only the operations of the pre-positioning functionality (e.g. 254), of affect simultaneously the operations of the scaling functionality (e.g. 252) and the pre-positioning functionality (e.g. 254). The control message may also include characteristics of the primary mosaiced video streams (e.g. A) generated by the primary SFP units (e.g. 200). For example, these characteristics comprise characteristics of an IP flow (e.g. source and destination IP addresses, source and destination ports) transporting the primary mosaiced video streams (e.g. A).

With respect to the positioning functionality (e.g. 354), it is controlled in a manner similar to the pre-positioning functionality (e.g. 254). For example, the secondary SFP unit (e.g. 300) receives a control message from a third-party computing device (not represented in the Figures). The control message comprises an identification of each of the primary mosaiced video streams (e.g. A, B, C, D), and the position of their corresponding scaled primary mosaiced video streams (e.g. E, F, G, H) within the secondary mosaiced video stream I (after respective scaling by the scaling functionality 352). During operations, an update control message may be received, to modify one or more positions applied to one or more of the scaled primary mosaiced video streams (e.g. only E and G). The control message may also include characteristics of the secondary mosaiced video stream I generated by the secondary SFP unit (e.g. 300). For example, these characteristics comprise characteristics of an IP flow (e.g. source and destination IP addresses, source and destination ports) transporting the secondary mosaiced video stream I.

The third-party computing device for controlling the operations of the scaling functionality (e.g. 252) includes a user interface, allowing a user to enter user commands. The user commands are processed by the third-party computing device to generate the control message transmitted to the primary SFP units (e.g. 200). The control message can be transported via the IP protocol. Upon reception of the control message (e.g. via the rear connector 17 of the primary SFP unit 200), the processing unit (e.g. 250) interprets the received control message, and controls the operations of the scaling functionality (e.g. 252) accordingly. The control message may be compliant with a standardized Control Plane Signaling protocol, such as the Simple Network Management Protocol (SNMP), OpenFlow, etc. Alternatively, the control message is compliant with a proprietary Control Plane Signaling protocol. The same mechanism is used for controlling the operations of the pre-positioning functionality (e.g. 254) and positioning functionality (e.g. 354).

Figure 15:
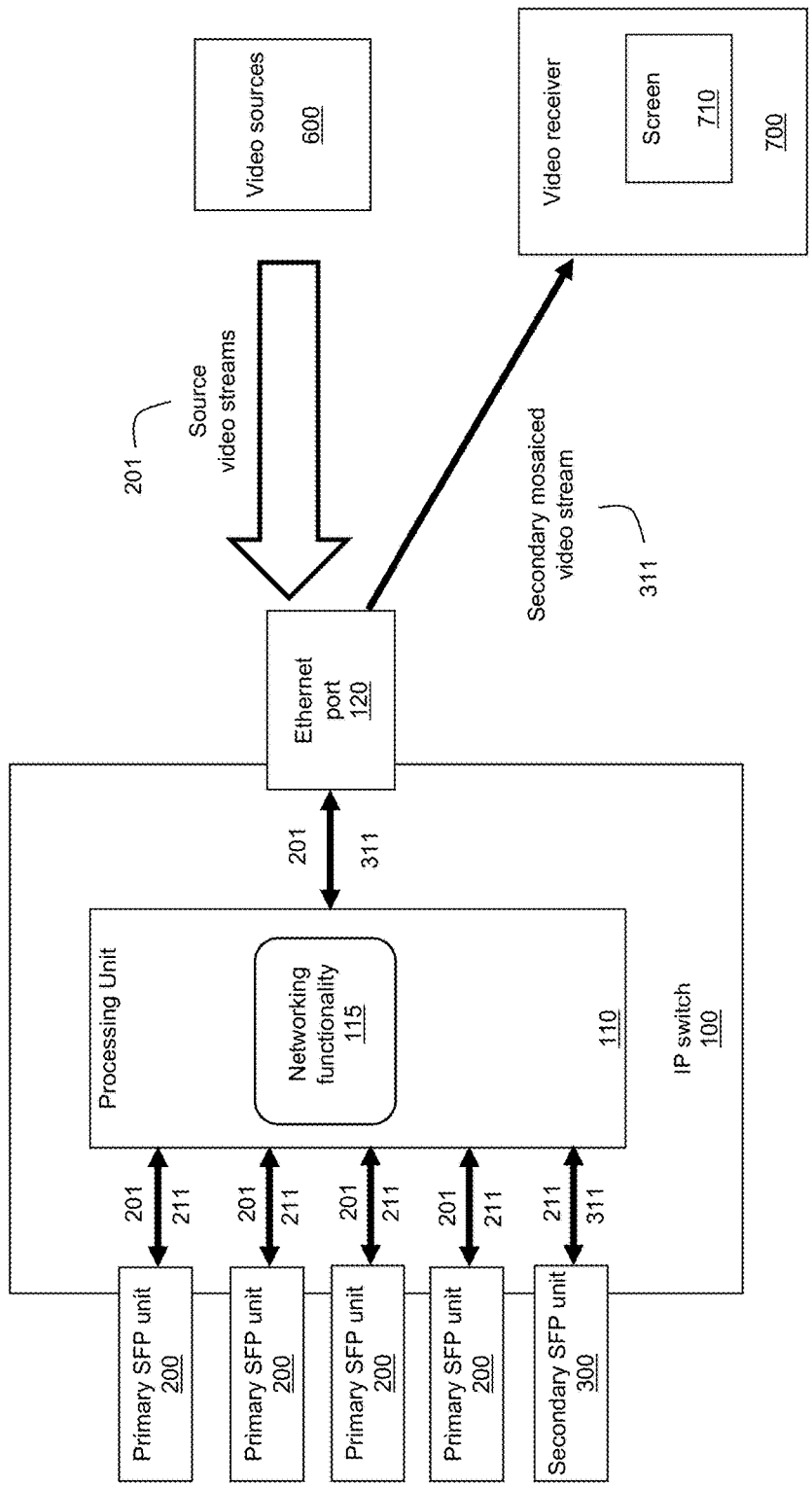
FIG. 15 illustrates an exemplary use case for the usage of the system represented in FIG. 7.

Reference is now made concurrently to FIGS. 7, 9A, 10A and 15; where FIG. 15 represents an exemplary use case for the usage of the system described in the present disclosure for providing scaling and positioning functionalities through cascaded standardized hot-pluggable transceiving units (and more specifically through cascaded SFP units in the present example). For illustration purposes, this exemplary use case corresponds to the system described in relation to FIG. 7. However, a person skilled in the art could easily adapt it to the system described in relation to FIG. 11.

The first layer of cascaded SFP units consisting of the four primary SFP units 200 is inserted in a chassis of an IP switch 100. The second layer of cascaded SFP units consisting of the secondary SFP unit 300 is also inserted in the chassis of the IP switch 100. As mentioned previously in the description, the number of primary SFP units 200 inserted in the chassis of the IP switch 100 may vary.

The IP switch 100 comprises a processing unit 110 implementing a networking functionality 115 (e.g. switching and/or routing). The processing unit 110 receives data packets through various networking interfaces of the IP switch 100, and the networking functionality 115 processes the received data packets to forward these data packets though one of the interfaces of the IP switch 100, as is well known in the art. Other types of equipment may be used in place of the IP switch 100, such as routers, gateways, video servers, etc. The only requirement on these equipment is that they include a chassis adapted for receiving the SFP units 200 and 300.

The exemplary use case represented in FIG. 15 corresponds to the configuration represented in FIGS. 9A and 10A. The IP switch 100 includes an Ethernet port 120 for receiving the source video streams 201 generated by one or more video sources 600. The source video streams 201 are transported by IP flows through an IP networking infrastructure between the video sources 600 and the IP switch 100.

Examples of video sources 600 include professional video recorders for the film industry, security cameras, television broadcasting equipment, etc. The video source 600 may directly generate an IP flow for transporting the source video streams 201. Alternatively, the video source 600 generates a video signal transporting the source video streams 201, which is converted by a video gateway (not represented in FIG. 15) into a corresponding IP flow transporting the source video streams 201.

The source video streams 201 are received through the Ethernet port 120, and forwarded to the primary SFP units 200 by the networking functionality 115, via the rear connectors 17 of the SFP units 200.

The primary mosaiced video streams 211 generated by the primary SFP units 200 are transmitted to the networking functionality 115, via the rear connectors 17 of the primary SFP units 200. The primary mosaiced video streams 211 are forwarded to the secondary SFP unit 300 by the networking functionality 115, via the rear connector 17 of the SFP unit 300.

The secondary mosaiced video stream 311 generated by the secondary SFP unit 300 is transmitted to the networking functionality 115, via the rear connector 17 of the secondary SFP unit 300. The secondary mosaiced video stream 311 is forwarded to a video receiver 700 by the networking functionality 115, via the Ethernet port of the IP switch 100.

The secondary mosaiced video stream 311 is transported by an IP flow through an IP networking infrastructure between the IP switch 100 and the video receiver 700. The video receiver 700 may be any type of equipment comprising a screen 700 for displaying the secondary mosaiced video stream 311. The frames of the secondary mosaiced video stream 311 displayed on the screen 700 are illustrated in FIG. 8D. The secondary mosaiced video stream 311 may be transmitted to several video receivers 700, for instance via a multicast IP flow as is well known in the art.

Another exemplary configuration (not represented in FIG. 15) corresponds to the configuration represented in FIGS. 9B and 10A. The source video streams 201 generated by the one or more video sources 600 are received via the front connectors 20 of the primary SFP units 200, instead of the Ethernet port 120.

Still another exemplary configuration (not represented in FIG. 15) corresponds to the configuration represented in FIGS. 9B and 10B. The source video streams 201 generated by the one or more video sources 600 are received via the front connectors 20 of the primary SFP units 200, instead of the Ethernet port 120. The secondary mosaiced video stream 311 generated by the secondary SFP unit 300 is outputted via the front connector 20 of the secondary SFP unit 300, instead of the Ethernet port 120.

Yet another exemplary configuration (not represented in FIG. 15) corresponds to the configuration represented in FIGS. 9A and 10B. The secondary mosaiced video stream 311 generated by the secondary SFP unit 300 is outputted via the front connector 20 of the secondary SFP unit 300, instead of the Ethernet port 120.

In some of the aforementioned configurations, the SFP units 200 and/or 300 are only physically connected to the IP switch 100 via their respective rear connector 17, but do not exchange data with the processing unit 110 of the IP switch 100. The exchange of data (the source video streams 201, the primary mosaiced video streams 211, and the secondary mosaiced video stream 311) is performed via the front connector(s) (e.g. 20).

In some of the aforementioned configurations, the SFP units 200 and/or 300 only exchange data (the source video streams 201, the primary mosaiced video streams 211, and the second mosaiced video stream 311) with the processing unit 110 of the IP switch 100 via their respective rear connector 17. There is no exchange of data via the front connector(s) (e.g. 20), and some SFP units may have no front connector(s) at all.

The IP switch 100 is capable of performing layer 3 and/or layer 2 forwarding of IP packets, as is well known in the art. The term IP switch is used generically, and may encompass switches, routers, etc. A router generally has more sophisticated routing capabilities than a switch.

However, the IP switch 100 is a highly specialized equipment, optimized for performing switching and/or routing of IP packets in a very effective manner. Therefore, the IP switch 100 generally does not have a native scaling functionality, pre-positioning functionality, or positioning functionality. The software of the IP switch 100 may be upgraded to implement at least some of these functionalities, at the risk of downgrading the performances of its switching and/or routing functionalities, and at a potentially prohibitive cost. Therefore, the use of the primary SFP units 200 and secondary SFP unit 300 is a simple, cost effective way to upgrade the IP switch 100 with the cascaded scaling/pre-positioning and positioning functionalities, without downgrading the intrinsic capabilities of the IP switch 100.

The transport of video payloads on an IP networking infrastructure has a major impact in terms of network load, which may result in congestion of the IP network, delays in the delivery of IP packets transporting a video payload, or even loss of packets (with an optional retransmission of the lost packets). For instance, a single video IP flow transporting a video payload requires a bandwidth of 1.5 Gbps in the case of a 720p or 1080i High Definition (HD) format, and a single video IP flow transporting a video payload requires a bandwidth of 3 Gbps in the case of a 1080p HD format. Since video is generally time sensitive, delays have a major impact on the perceived quality of a video transmission. Existing technologies, such as Qualify of Service (QoS) policies can be used to guarantee the delivery of a video IP flow within acceptable boundaries in terms of delays. However, enforcing a QoS policy for a video IP flow increases the cost (a premium fee needs to be paid for benefiting of a QoS policy prioritizing the IP packets of a particular IP flow) and/or complexity of delivery (additional control signaling is used to enforce the QoS policy).

If the source video streams 201 respectively transport a HD video payload requiring a bandwidth of 1.5 Gbps, a total bandwith of 24 Gbps is necessary for transporting the corresponding 16 source video streams 201 (represented in FIG. 7) on the IP networking infrastructure. However, if the first layer comprising the primary SFP units 200 applies an average scaling factor of ¼, and the second layer comprising the secondary SFP unit 300 applies an average scaling factor of ½, the secondary mosaiced video stream 311 projected on the screen 710 of the video receiver 700 is equivalent to only two HD video payloads for a total of 24*¼ *½=3 Gbps transported on the IP networking infrastructure. Thus, in this exemplary use case, by performing the scaling operations at the IP switch 100 via the primary SFP units 200 and the secondary SFP unit 300 (instead of performing it at the final video receiver 700), 21 Gbps of bandwidth are saved in the IP networking infrastructure between the IP switch 100 and the final video receiver 700. Furthermore, performing the pre-positioning and positioning operations at the IP switch 100 via the primary SFP units 200 and secondary SFP unit 200 (instead of performing it at the final video receiver 700) drastically reduces the number of video streams (1 instead of 16) transported on the IP networking infrastructure between the IP switch 100 and the final video receiver 700.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A system comprising:
 a plurality of primary standardized hot-pluggable transceiving units respectively comprising:
  a primary housing having standardized dimensions and adapted to being inserted into a chassis of a hosting unit;
  at least one primary connector for receiving a plurality of source video streams;
  at least one primary processing unit in the primary housing for:
   scaling the plurality of source video streams into a corresponding plurality of scaled video streams;
   mosaicing the plurality of scaled video streams into a primary mosaiced video stream; and
   outputting the primary mosaiced video stream via one of: the at least one primary connector or another primary connector of the plurality of primary transceiving units; and
 a secondary standardized hot-pluggable transceiving unit comprising:
  a secondary housing having standardized dimensions and adapted to being inserted into the chassis of the hosting unit;
  at least one secondary connector for receiving the primary mosaiced video streams from the plurality of primary transceiving units;
  at least one secondary processing unit in the secondary housing for:
   scaling the primary mosaiced video streams into corresponding scaled primary mosaiced video streams;
   mosaicing the scaled primary mosaiced video streams into a secondary mosaiced video stream; and
   outputting the secondary mosaiced video stream via one of: the at least one secondary connector or another secondary connector of the secondary transceiving unit.

2. The system of claim 1, wherein each source video stream transports a plurality of source video frames, each corresponding scaled video stream transports a plurality of scaled video frames, and the scaling comprises applying a scaling ratio to the plurality of source video frames to generate the corresponding plurality of scaled video frames.

3. The system of claim 1, wherein each primary mosaiced video stream transports a plurality of primary mosaiced video frames, each corresponding scaled primary mosaiced video stream transports a plurality of scaled primary mosaiced video frames, and the scaling comprises applying a scaling ratio to the plurality of primary mosaiced video frames to generate the corresponding plurality of scaled primary mosaiced video frames.

4. The system of claim 1, wherein mosaicing the plurality of scaled video streams into the primary mosaiced video stream comprises combining scaled video frames respectively transported by the plurality of scaled video streams at respective given positions within primary mosaiced video frames transported by the primary mosaiced video stream.

5. The system of claim 1, wherein mosaicing the scaled primary mosaiced video streams into the secondary mosaiced video stream comprises combining scaled primary mosaiced video frames respectively transported by the scaled primary mosaiced video streams at respective given positions within secondary mosaiced video frames transported by the secondary mosaiced video stream.

6. The system of claim 1, wherein each primary transceiving unit receives a control message from a third-party computing device, the control message comprising at least one of the following: a scaling ratio associated to each one of the plurality of source video streams received by the primary transceiving unit, and a position associated to each one of the scaled video streams generated by the primary transceiving unit.

7. The system of claim 1, wherein the secondary transceiving unit receives a control message from a third-party computing device, the control message comprising at least one of the following: a scaling ratio associated to each one of the primary mosaiced video streams received by the secondary transceiving unit, and a position associated to each one of the scaled primary mosaiced video streams generated by the secondary transceiving unit.

8. The system of claim 1, wherein the at least one secondary processing unit of the secondary transceiving unit executes a post-production functionality on the secondary mosaiced video stream before it is outputted.

9. The system of claim 1, wherein the plurality of source video streams is received via a primary rear connector located on a back panel of the plurality of primary transceiving units, the primary mosaiced video streams are outputted via the primary rear connector located on the back panel of the plurality of primary transceiving units, the primary mosaiced video streams are received via a secondary rear connector located on a back panel of the secondary transceiving unit, and the secondary mosaiced video stream is outputted via the secondary rear connector located on the back panel of the secondary transceiving unit.

10. The system of claim 1, wherein:
the at least one secondary connector of the secondary standardized hot-pluggable transceiving unit receives a plurality of source video streams;
the at least one secondary processing unit of the secondary standardized hot-pluggable transceiving unit scales the plurality of source video streams received by the at least one secondary connector of the secondary standardized hot-pluggable transceiving unit into a corresponding plurality of internal scaled video streams;
the at least one secondary processing unit of the secondary standardized hot-pluggable transceiving unit mosaices the plurality of internal scaled video streams into an internal primary mosaiced video stream;
the at least one secondary processing unit of the secondary standardized hot-pluggable transceiving unit scales the internal primary mosaiced video stream into a corresponding scaled internal primary mosaiced video stream; and
the at least one secondary processing unit of the secondary standardized hot-pluggable transceiving unit mosaices the scaled primary mosaiced video streams generated by the at least one secondary processing unit of the secondary standardized hot-pluggable transceiving unit and the scaled internal primary mosaiced video stream into the secondary mosaiced video stream.

11. A system comprising:
at least one primary standardized hot-pluggable transceiving unit comprising:
a primary housing having standardized dimensions and adapted to being inserted into a chassis of a hosting unit;
at least one primary connector for receiving a plurality of source video streams;
at least one primary processing unit in the primary housing for:
scaling the plurality of source video streams into a corresponding plurality of primary scaled video streams; and
outputting the plurality of primary scaled video streams via one of: the at least one primary connector or another primary connector of the at least one primary transceiving unit; and
a secondary standardized hot-pluggable transceiving unit comprising:
a secondary housing having standardized dimensions and adapted to being inserted into the chassis of the hosting unit;
at least one secondary connector for receiving the plurality of primary scaled video streams from the at least one primary transceiving unit;
at least one secondary processing unit in the secondary housing for:
scaling the plurality of primary scaled video streams into a corresponding plurality of secondary scaled video streams;
mosaicing the plurality of secondary scaled video streams into a mosaiced video stream; and
outputting the mosaiced video stream via one of: the at least one secondary connector or another secondary connector of the secondary transceiving unit.

12. The system of claim 11, wherein each source video stream transports a plurality of source video frames, each corresponding primary scaled video stream transports a plurality of primary scaled video frames, and the scaling comprises applying a scaling ratio to the plurality of source video frames to generate the corresponding plurality of primary scaled video frames.

13. The system of claim 11, wherein each primary scaled video stream transports a plurality of primary scaled video frames, each corresponding secondary scaled video stream transports a plurality of secondary scaled video frames, and the scaling comprises applying a scaling ratio to the plurality of primary scaled video frames to generate the corresponding plurality of secondary scaled video frames.

14. The system of claim 11, wherein mosaicing the plurality of secondary scaled video streams into the mosaiced video stream comprises combining secondary scaled video frames respectively transported by the plurality of secondary scaled video streams at respective given positions within mosaiced video frames transported by the mosaiced video stream.

15. The system of claim 11, wherein each primary transceiving unit receives a control message from a third-party computing device, the control message comprising a scaling ratio associated to each one of the plurality of source video streams received by the primary transceiving unit.

16. The system of claim 11, wherein the secondary transceiving unit receives a control message from a third-party computing device, the control message comprising at least one of the following: a scaling factor associated to each one of the primary scaled video streams received by the secondary transceiving unit, and a position associated to each one of the secondary scaled video streams generated by the secondary transceiving unit.

17. The system of claim 11, wherein the at least one secondary processing unit of the secondary transceiving unit executes a post-production functionality on the mosaiced video stream before it is outputted.

18. The system of claim 11, wherein the plurality of source video streams is received via a primary rear connector located on a back panel of the at least one primary transceiving unit, the plurality of primary scaled video streams is outputted via the primary rear connector located on the back panel of the at least one primary transceiving unit, the plurality of primary scaled video streams is received via a secondary rear connector located on a back panel of the secondary transceiving unit, and the mosaiced video stream is outputted via the secondary rear connector located on the back panel of the secondary transceiving unit.

19. The system of claim 11, wherein:
the at least one secondary connector of the secondary standardized hot-pluggable transceiving unit receives a plurality of source video streams;
the at least one secondary processing unit of the secondary standardized hot-pluggable transceiving unit scales the plurality of source video streams received by the at least one secondary connector of the secondary standardized hot-pluggable transceiving unit into a corresponding plurality of internal primary scaled video streams;
the at least one secondary processing unit of the secondary standardized hot-pluggable transceiving unit scales the plurality of internal primary scaled video streams into a corresponding plurality of internal secondary scaled video streams; and
the at least one secondary processing unit of the secondary standardized hot-pluggable transceiving unit mosaices the plurality of secondary scaled video streams generated by the at least one secondary processing unit of the secondary standardized hot-pluggable transceiving unit and the plurality of internal secondary scaled video streams into the mosaiced video stream.

20. A system comprising:
a plurality of primary standardized hot-pluggable transceiving units respectively comprising:
　a primary housing having standardized dimensions and adapted to being inserted into a chassis of a hosting unit;
　at least one primary connector for receiving a plurality of scaled video streams;
　at least one primary processing unit in the primary housing for:
　　mosaicing the plurality of scaled video streams into a primary mosaiced video stream; and
　　outputting the primary mosaiced video stream via one of: the at least one primary connector or another primary connector of the plurality of primary transceiving units; and
a secondary standardized hot-pluggable transceiving unit comprising:
　a secondary housing having standardized dimensions and adapted to being inserted into the chassis of the hosting unit;
　at least one secondary connector for receiving the primary mosaiced video streams from the plurality of primary transceiving units;
　at least one secondary processing unit in the secondary housing for:
　　scaling the primary mosaiced video streams into corresponding scaled primary mosaiced video streams;
　　mosaicing the scaled primary mosaiced video streams into a secondary mosaiced video stream; and
　　outputting the secondary mosaiced video stream via one of: the at least one secondary connector or another secondary connector of the secondary transceiving unit.

* * * * *